United States Patent
Tsujimoto

(10) Patent No.: US 10,640,585 B2
(45) Date of Patent: May 5, 2020

(54) ULTRA-HIGH MOLECULAR WEIGHT POLYETHYLENE FIBER

(71) Applicant: Asahi Kasei Kabushiki Kaisha, Tokyo (JP)

(72) Inventor: Koichi Tsujimoto, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/185,330

(22) Filed: Nov. 9, 2018

(65) Prior Publication Data

US 2019/0153128 A1     May 23, 2019

(30) Foreign Application Priority Data

Nov. 15, 2017    (JP) .................... 2017-220420

(51) Int. Cl.
| | |
|---|---|
| *C08F 10/02* | (2006.01) |
| *D01D 1/02* | (2006.01) |
| *D01F 6/04* | (2006.01) |
| *C08F 4/659* | (2006.01) |

(52) U.S. Cl.
CPC .............. *C08F 10/02* (2013.01); *D01D 1/02* (2013.01); *D01F 6/04* (2013.01); *C08F 4/65908* (2013.01); *C08F 4/65912* (2013.01); *C08F 4/65916* (2013.01); *C08F 2420/02* (2013.01)

(58) Field of Classification Search
CPC .. C08F 10/02; C08F 4/65908; C08F 4/65912; C08F 4/65916; C08F 2420/02; D01D 1/02; D01F 6/04
USPC ........................................................ 526/352
See application file for complete search history.

(56) References Cited

U.S. PATENT DOCUMENTS

| | | | |
|---|---|---|---|
| 2003/0203203 A1* | 10/2003 | Ohta | .................. C04B 16/0625 428/394 |
| 2015/0299903 A1 | 10/2015 | Tanaka et al. | |
| 2016/0272738 A1 | 9/2016 | Severn et al. | |

FOREIGN PATENT DOCUMENTS

| | | |
|---|---|---|
| JP | S62-015317 A | 1/1987 |
| JP | S63-296927 A | 12/1988 |
| JP | 2004-285557 A | 10/2004 |
| JP | 2010-148481 A | 7/2010 |
| JP | 2014-055287 A | 3/2014 |
| JP | 2014-118535 A | 6/2014 |
| JP | 2015-212373 A | 11/2015 |
| JP | 2016-094554 A | 5/2016 |
| JP | 2016-534165 A | 11/2016 |
| WO | 01/012885 A1 | 2/2001 |

OTHER PUBLICATIONS

Decision to Grant issued in corresponding Japanese Patent Application No. 2017/220420 dated May 29, 2019.
Notice of Reasons of Refusal issued in corresponding Japanese Patent Application No. 2017/220420 dated Jan. 24, 2019.

* cited by examiner

*Primary Examiner* — Ling Siu Choi
*Assistant Examiner* — Ronald Grinsted
(74) *Attorney, Agent, or Firm* — Morgan, Lewis & Bockius LLP

(57) ABSTRACT

The present invention provides an ultra-high molecular weight polyethylene fiber having a viscosity-average molecular weight of $10 \times 10^4$ to $1000 \times 10^4$, wherein the ultra-high molecular weight polyethylene fiber has at least three melting peaks in a heating differential scanning calorimetry curve (DSC curve), and in the melting peaks, the difference between (I) a peak temperature of a melting peak appearing between 140° C. or higher and lower than 150° C. and (II) a peak temperature of a melting peak appearing between 150° C. or higher and lower than 158° C. is 10° C. or less.

8 Claims, 1 Drawing Sheet

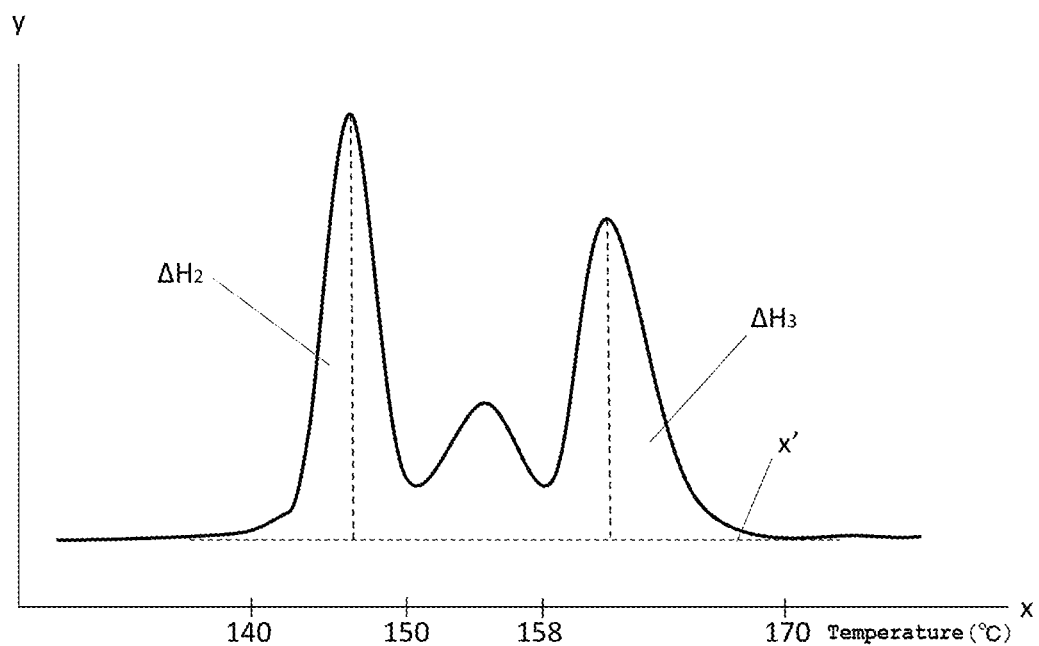

ULTRA-HIGH MOLECULAR WEIGHT POLYETHYLENE FIBER

TECHNICAL FIELD

The present invention relates to an ultra-high molecular weight polyethylene fiber.

DESCRIPTION OF THE RELATED ART

Background Art

Multifilament or monofilament braids are employed in many uses such as for fishing lines and ropes for ship mooring. As these uses for braids have been diversified, there has been a growing demand for higher performance required for the braids and various studies have been made. For example, Patent Documents 1 and 2 disclose an ultra-high molecular weight polyethylene fiber and state that the ultra-high molecular weight polyethylene fiber is excellent in strength.

Particularly, fishing lines and ropes for ship mooring have been required, in recent years, to have high strength and creep resistance. The braids for fishing lines or ropes for ship mooring have a structure of a strand of a plurality of fibers. Therefore, these braids need to maintain this strand structure. Thus, the fibers constituting the braids are required to be excellent in shape retention.

The production of the fibers constituting the braids involves the step of winding a thread. This production is required to be capable of winding a thread at a high speed from the viewpoint of productivity.

CITATION LIST

Patent Literature

Patent Literature 1: Japanese Unexamined Patent Application Publication No. 2010-148481
Patent Literature 2: Japanese Unexamined Patent Application Publication No. S63-296927

SUMMARY OF INVENTION

Technical Problem

However, it is very difficult to achieve both of the excellent strength, creep resistance, and shape retention of fibers and the capability of winding a thread at a high speed.

The present invention has been made in light of these problems, and an object of the present invention is to provide an ultra-high molecular weight polyethylene fiber that achieves all of excellent strength, creep resistance, and shape retention and the capability of winding a thread at a high speed.

Solution to Problem

The present inventor has conducted diligent studies to attain the object and consequently completed the present invention by finding that a predetermined ultra-high molecular weight polyethylene fiber can achieve all of excellent strength, creep resistance, and shape retention and the capability of winding a thread at a high speed.

Specifically, the present invention is as follows:

[1] An ultra-high molecular weight polyethylene fiber having a viscosity-average molecular weight of $10 \times 10^4$ to $1000 \times 10^4$, wherein
the ultra-high molecular weight polyethylene fiber has at least three melting peaks in a heating differential scanning calorimetry curve (DSC curve), and
in the melting peaks, the difference between (I) a peak temperature of a melting peak appearing between 140° C. or higher and lower than 150° C. and (II) a peak temperature of a melting peak appearing between 150° C. or higher and lower than 158° C. is 10° C. or less.

[2] The ultra-high molecular weight polyethylene fiber according to [1], wherein
a ratio of an area ($\Delta H_2$) at or below (I) a peak temperature of a melting peak appearing between 140° C. or higher and lower than 150° C. to an area ($\Delta H_1$) of a whole melting peak is 15% or more and 35% or less, and
a ratio of an area ($\Delta H_3$) at or above (III) a peak temperature of a melting peak appearing between 158° C. or higher and 170° C. or lower to the area ($\Delta H_1$) of the whole melting peak is 5% or more and 10% or less.

[3] The ultra-high molecular weight polyethylene fiber according to [1] or [2], wherein the ultra-high molecular weight polyethylene fiber has a degree of orientation of 0.40 or more.

[4] The ultra-high molecular weight polyethylene fiber according to any of [1] to [3], comprising a copolymer of ethylene and a comonomer, wherein
a content of a comonomer unit in the copolymer is 0.01% by mol or more and 5% by mol or less.

[5] The ultra-high molecular weight polyethylene fiber according to any of [1] to [4], wherein the ultra-high molecular weight polyethylene fiber has a titanium content of 5 ppm or lower.

[6] The ultra-high molecular weight polyethylene fiber according to any of [1] to [5], wherein the ultra-high molecular weight polyethylene fiber has a silicon content of 0.1 ppm or higher and 50 ppm or lower.

[7] The ultra-high molecular weight polyethylene fiber according to any of [1] to [6], wherein the ultra-high molecular weight polyethylene fiber has Mw/Mn of 3.0 or more and 13 or less.

[8] The ultra-high molecular weight polyethylene fiber according to any of [1] to [7], wherein the ultra-high molecular weight polyethylene fiber has an ash content of 100 ppm or lower.

[9] The ultra-high molecular weight polyethylene fiber according to any of [1] to [8], wherein the ultra-high molecular weight polyethylene fiber has a creep life of at least 72 hours at a temperature of 70° C. under 30% load of breaking stress.

Advantageous Effects of Invention

The present invention can provide a fiber that achieves every performance of excellent strength, creep resistance, and shape retention and the capability of winding a thread at a high speed.

BRIEF DESCRIPTION OF THE DRAWING

FIG. 1 shows a schematic diagram of one example of a DSC curve obtained by the heating differential scanning calorimetry of the ultra-high molecular weight polyethylene fiber of the present embodiment.

DESCRIPTION OF EMBODIMENTS

Hereinafter, a mode for carrying out the present invention (hereinafter, simply referred to as the "present embodiment") will be described in detail. However, the present invention is not intended to by limited thereby. Various changes or modifications can be made in the present invention without departing from the spirit thereof.

[Ultra-High Molecular Weight Polyethylene Fiber]

The ultra-high molecular weight polyethylene fiber of the present embodiment has a viscosity-average molecular weight of $10 \times 10^4$ to $1000 \times 10^4$.

Also, the ultra-high molecular weight polyethylene fiber of the present embodiment has at least three melting peaks in a heating differential scanning calorimetry curve (DSC curve).

In the melting peaks, the difference between (I) a peak temperature of a melting peak appearing between 140° C. or higher and lower than 150° C. and (II) a peak temperature of a melting peak appearing between 150° C. or higher and lower than 158° C. is 10° C. or less.

The ultrahigh molecular weight of the ultra-high molecular weight polyethylene fiber of the present embodiment refers to a viscosity-average molecular weight of $10 \times 10^4$ to $1000 \times 10^4$.

[Viscosity-Average Molecular Weight]

The viscosity-average molecular weight (Mv) of the ultra-high molecular weight polyethylene fiber of the present embodiment is preferably $50 \times 10^4$ to $950 \times 10^4$, more preferably $100 \times 10^4$ to $950 \times 10^4$.

The viscosity-average molecular weight (Mv) of $10 \times 10^4$ or higher further improves strength. Also, the viscosity-average molecular weight (Mv) of $1000 \times 10^4$ or lower further improves moldability. The viscosity-average molecular weight within the range mentioned above offers better productivity and can suppress reduction in strength of the molding. In the present embodiment, the viscosity-average molecular weight refers to a value determined by dissolving the fiber in decahydronaphthalene, determining an intrinsic viscosity from the specific viscosity of the solution, and converting the intrinsic viscosity to a viscosity-average molecular weight.

The viscosity-average molecular weight (Mv) can be adjusted by the adjustment of a polymerization temperature in a polymerization step for the polyethylene and/or the type of a polymerization catalyst.

Specifically, the viscosity-average molecular weight (Mv) can be measured by a method described in Examples.

[Mw/Mn]

The molecular weight distribution (Mw/Mn) value of the ultra-high molecular weight polyethylene fiber of the present embodiment is preferably 3.0 or more and 13 or less, more preferably 3.5 or more and 11 or less, further preferably 4.0 or more and 10 or less. The ultra-high molecular weight polyethylene fiber having a molecular weight distribution (Mw/Mn) value of 3.0 or more tends to have excellent moldability, the capability of winding a thread at a high speed, and also a uniform thread diameter. The ultra-high molecular weight polyethylene fiber having a molecular weight distribution (Mw/Mn) value of 13 or less tends to have high strength and/or modulus of elasticity.

Mw represents a weight-average molecular weight, and Mn represents a number-average molecular weight.

The molecular weight distribution can be adjusted to be smaller by using a catalyst mentioned later or keeping conditions (hydrogen concentration, temperature, ethylene pressure, etc.) within a polymerization system constant. On the other hand, examples of the method for adjusting the molecular weight distribution of an ethylene polymer to be larger include an approach of changing conditions during polymerization of batch-type polymerization (e.g., changing the concentration of a chain transfer agent hydrogen during polymerization, or changing the temperature), and an approach of changing conditions within a polymerization system using a plurality of reactors in continuous polymerization.

The molecular weight distribution can be measured by gel permeation chromatography (GPC).

[Melting Peak]

The ultra-high molecular weight polyethylene fiber of the present embodiment has at least three melting peaks in a heating differential scanning calorimetry curve (DSC curve). In the melting peaks, the difference between (I) a peak temperature of a melting peak appearing between 140° C. or higher and lower than 150° C. and (II) a peak temperature of a melting peak appearing between 150° C. or higher and lower than 158° C. is 10° C. or less.

The ultra-high molecular weight polyethylene fiber is drawable at a draw ratio exceeding ×30 and becomes an ultra-high molecular weight polyethylene fiber having high strength and a high modulus of elasticity, because a network connecting crystals is formed in a spinning step. In melt drawing, the generation and growth of oriented crystals such as hexagonal crystals or orthorhombic crystals occur with improvement in draw ratio. A conventional ultra-high molecular weight polyethylene fiber has one peak each at 140° C. or higher and lower than 150° C. and at 155° C. or higher and lower than 160° C. in a DSC heating curve. On the other hand, the ultra-high molecular weight polyethylene fiber of the present embodiment has at least one peak each at 140° C. or higher and lower than 150° C. and at 150° C. or higher and lower than 158° C., preferably at least one peak each at 140° C. or higher and lower than 150° C., at 150° C. or higher and lower than 158° C., and at 158° C. or higher and lower than 165° C.

The melting peaks for calculating the difference between (I) a peak temperature of a melting peak appearing between 140° C. or higher and lower than 150° C. and (II) a peak temperature of a melting peak appearing between 150° C. or higher and lower than 158° C. are peaks at the highest temperatures appearing between 140° C. or higher and lower than 150° C. and between 150° C. or higher and lower than 158° C.

In the heating differential scanning calorimetry curve (DSC curve) of the ultra-high molecular weight polyethylene fiber of the present embodiment, the difference between (I) a peak temperature of a melting peak appearing between 140° C. or higher and lower than 150° C. and (II) a peak temperature of a melting peak appearing between 150° C. or higher and lower than 158° C. is 10° C. or less, preferably less than 10° C., more preferably less than 9° C., further preferably less than 8° C.

The lower limit of the difference between the peak temperatures (I) and (II) is not particularly limited and is preferably 2° C. or more, more preferably 3° C. or more, further preferably 4° C. or more.

The ultra-high molecular weight polyethylene fiber having a difference of 2° C. or more between the peak temperatures (I) and (II) tends to have high strength and also high creep resistance.

The ultra-high molecular weight polyethylene fiber having a difference of 10° C. or less between the peak temperatures (I) and (II) tends to have high strength and also high creep resistance and can achieve both of these performances. The ultra-high molecular weight polyethylene fiber having a difference of 10° C. or less between the peak temperatures (I) and (II) also tends to be windable at a high speed by spinning and have high thread shape retention performance.

Examples of the method for adjusting melting peaks to at least three peaks in the heating differential scanning calorimetry curve (DSC curve) of the ultra-high molecular weight polyethylene fiber of the present embodiment, and the method for adjusting the difference between (I) a peak temperature of a melting peak appearing between 140° C. or higher and lower than 150° C. and (II) a peak temperature of a melting peak appearing between 150° C. or higher and lower than 158° C. to 10° C. or less include: a method which involves mixing an ultrahigh-molecular-weight polyethylene powder, a solvent, an antioxidant, etc. into a slurry form, and then completely replacing a gas in the powder with the solvent by vacuum deaeration, followed by introduction into an extruder; a method which involves adjusting an oxygen concentration to 0.1% or lower by performing kneading in an extruder under nitrogen; a method which involves introducing 10% or more and 50% or less of the amount of a solvent to be introduced to an extruder, from the intermediate portion between a die and a slurry introduction site in the extruder using a side feed; and a method which involves introducing a solvent to be introduced using a side feed, in a state heated to 100° C. or higher and 200° C. or lower.

In the present embodiment, the melting peak is regarded as a peak having a height of 5% or more from the peak top (maximum) to the bottom when the largest height from the peak top to the bottom is defined as 100%. The melting peaks and the quantity of heat of melting of the ultra-high molecular weight polyethylene fiber of the present embodiment are values measured using a differential scanning calorimeter Pyris 1 (trade name) manufactured by PerkinElmer, Inc., and can be determined by keeping 8.4 mg of a sample containing the ultra-high molecular weight polyethylene fiber at 50° C. for 1 minute and then heating the sample to 180° C. at a rate of 10° C./min.

In the present embodiment, specifically, the observation of melting peaks and the measurement of the difference between peak temperatures of melting peaks in the heating differential scanning calorimetry curve (DSC curve) can be performed by a method described in Examples.

[Quantity of Heat of Melting]

In the heating differential scanning calorimetry curve (DSC curve) of the ultra-high molecular weight polyethylene fiber of the present embodiment, a ratio of an area ($\Delta H_2$) at or below (I) a peak temperature of a melting peak appearing between 140° C. or higher and lower than 150° C. to an area ($\Delta H_1$) of a whole melting peak is preferably 15% or more and 35% or less, more preferably 20% or more and 30% or less, further preferably 20% or more and less than 30%. A ratio of an area ($\Delta H_3$) at or above (III) a peak temperature of a melting peak appearing between 158° C. or higher and 170° C. or lower to the area ($\Delta H_1$) of the whole melting peak is preferably 5% or more and 10% or less, more preferably 5.5% or more and 9.5% or less, further preferably 6% or more and 9% or less.

FIG. 1 schematically shows one example of a DSC curve obtained by the heating differential scanning calorimetry of the ultra-high molecular weight polyethylene fiber of the present embodiment.

The area ($\Delta H_1$) of the whole melting peak is the area of a portion between a straight line (x') connecting respective bases present at lower than 140° C. and at higher than 170° C. in the DSC curve, and the DSC curve.

The area ($\Delta H_2$) at or below (I) a peak temperature of a melting peak appearing between 140° C. or higher and lower than 150° C. is the area of a portion surrounded by a straight line vertically connecting the peak top of the melting peak appearing between 140° C. or higher and lower than 150° C. and the x axis, the DSC curve, and the straight line (x').

The area ($\Delta H_3$) at or above (III) a peak temperature of a melting peak appearing between 158° C. or higher and 170° C. or lower is the area of a portion surrounded by a straight line vertically connecting the peak top of the melting peak appearing between 158° C. or higher and 170° C. or lower and the x axis, the DSC curve, and the straight line (x').

The melting peaks for calculating $\Delta H_2$ and $\Delta H_3$ are peaks at the highest temperatures appearing between 140° C. or higher and lower than 150° C. and between 158° C. or higher and 170° C. or lower.

The ultra-high molecular weight polyethylene fiber having 15% or more ratio of an area ($\Delta H_2$) at or below (I) a peak temperature of a melting peak appearing between 140° C. or higher and lower than 150° C. to the area ($\Delta H_1$) of the whole melting peak tends to become a thread that resists curling. On the other hand, the ultra-high molecular weight polyethylene fiber having 35% or less ratio of $\Delta H_2$ tends to be excellent in creep resistance and have high strength.

The ultra-high molecular weight polyethylene fiber having 5% or more ratio of an area ($\Delta H_3$) at or above (III) a peak temperature of a melting peak appearing between 158° C. or higher and 170° C. or lower to the area ($\Delta H_1$) of the whole melting peak tends to become a fiber that is excellent in creep resistance, has high strength, and is also excellent in cutting resistance. On the other hand, the ultra-high molecular weight polyethylene fiber having 10% or less ratio of $\Delta H_3$ tends to become a multifilament that is excellent in the shape retention of a strand of several single yarns and is less likely to be raveled.

In the present embodiment, the ratios of an area ($\Delta H_2$) at or below (I) a peak temperature of a melting peak appearing between 140° C. or higher and lower than 150° C. and an area ($\Delta H_3$) at or above (III) a peak temperature of a melting peak appearing between 158° C. or higher and 170° C. or lower to the area ($\Delta H_1$) of the whole melting peak may be adjusted to the ranges mentioned above. The resulting thread tends to resist curling and be excellent in shape retention, in addition to creep resistance and strength.

In the present embodiment, examples of the method for adjusting the ratio of an area ($\Delta H_2$) at or below (I) a peak temperature of a melting peak appearing between 140° C. or higher and lower than 150° C. to the area ($\Delta H_1$) of the whole melting peak to 15% or more and 35% or less, and adjusting the ratio of an area ($\Delta H_3$) at or above (III) a peak temperature of a melting peak appearing between 158° C. or higher and 170° C. or lower to the area ($\Delta H_1$) of the whole melting peak to 5% or more and 10% or less include: a method which involves mixing an ultrahigh-molecular-weight polyethylene powder, a solvent, an antioxidant, etc. into a slurry form, and then completely replacing a gas in the powder with the solvent by vacuum deaeration, followed by introduction into an extruder; a method which involves performing stirring in a slurry form at 80° C. or higher for 1 hour or longer, followed by introduction into an extruder; a method which involves adjusting an oxygen concentration to 0.1% or lower by performing kneading in an extruder under nitrogen; a method which involves introducing 10% or more and 50% or less of the amount of a solvent to be introduced to an extruder, from the intermediate portion between a die and a slurry introduction site in the extruder using a side feed; and a method which involves introducing a solvent to be introduced using a side feed, in a state heated to 100° C. or higher and 200° C. or lower.

The quantity of heat of melting ($\Delta H$) of the ultra-high molecular weight polyethylene fiber of the present embodiment is a value measured using a differential scanning calorimeter Pyris 1 (trade name) manufactured by PerkinElmer, Inc., and can be determined by keeping 8.4 mg of a sample containing the ultra-high molecular weight polyethylene fiber at 50° C. for 1 minute, then heating the sample to 180° C. at a rate of 10° C./min, and dividing the total quantity of heat calculated from all crystal peak areas in the melting curve thus obtained by the weight of the sample.

The ultrahigh-molecular-weight polyethylene powder having a higher quantity of heat of melting ($\Delta H$) has a higher degree of crystallinity and is more preferred for the production of a drawn molded article. On the other hand, a polyethylene starts to dissolve from an amorphous moiety. Therefore, a polyethylene having a higher degree of crystallinity is generally more difficult to mold. In the present embodiment, the degree of crystallinity means the percentage of the quantity of heat of melting (unit: J/g) of an ultrahigh-molecular-weight polyethylene powder to the quantity of heat of melting (290.4 J/g) of a completely crystalline polyethylene.

In the present embodiment, specifically, the observation of melting peaks and the measurement of the difference between peak temperatures of melting peaks in the heating differential scanning calorimetry curve (DSC curve) can be performed by a method described in Examples.

The ultra-high molecular weight polyethylene fiber of the present embodiment is preferably a fiber comprising an ethylene homopolymer and/or a copolymer of ethylene and an olefin (comonomer) copolymerizable therewith.

Specific examples of the olefin copolymerizable with ethylene include, but are not particularly limited to, at least one olefin selected from the group consisting of $\alpha$-olefins having 3 to 15 carbon atoms, cyclic olefins having 3 to 15 carbon atoms, compounds represented by formula $CH_2=CHR^1$ (wherein $R^1$ is an aryl group having 6 to 12 carbon atoms), and linear, branched, or cyclic dienes having 3 to 15 carbon atoms. Examples of the $\alpha$-olefin include, but are not particularly limited to, propylene, 1-butene, 4-methyl-1-pentene, 1-hexene, 1-octene, 1-nonene, 1-decene, 1-undecene, 1-dodecene, 1-tridecene, and 1-tetradecene.

In the present embodiment, the content of a unit derived from the comonomer (hereinafter, also referred to as a comonomer unit) in the copolymer obtained by the copolymerization of ethylene and the olefin (comonomer) copolymerizable therewith is preferably 0.01% by mol or more and 5% by mol or less, more preferably 0.01% by mol or more and 2% by mol or less, further preferably 0.01% by mol or more and 1% by mol or less. The comonomer unit content of 0.01% by mol or more can yield a thread excellent in creep resistance. Also, the comonomer content of 5% by mol or less tends to be able to yield a thread having high strength and a high modulus of elasticity. Creep resistance and strength tend to be both achieved by appropriately adjusting the content of the comonomer.

The content of the comonomer unit in the copolymer can be controlled by adjusting the amount of the comonomer added in the polymerization step for the polyethylene.

Specifically, the content of the comonomer unit in the copolymer can be measured by a method described in Examples.

[Degree of Orientation]

The degree of orientation of the ultra-high molecular weight polyethylene fiber of the present embodiment is preferably 0.40 or more. The largest value of the degree of orientation is 1. When the ultra-high molecular weight polyethylene fiber is compared with a fiber spun from the same raw material thereas, a fiber having a higher degree of orientation tends to have higher strength.

The degree of orientation can be adjusted by adjusting a polymer concentration, a temperature, etc. for melt kneading, and thereby disentangling a molecular chain. The disentanglement permits a higher level of drawing. The molecular chain is more easily disentangled by decreasing the polymer concentration for melt kneading and more easily disentangled by increasing the temperature for melt kneading.

The degree of orientation can be calculated, for example, by installing a Berek compensator (unit model: U-CBE) manufactured by Olympus Corp. in an optical system microscope (unit model: BX51TRF-6(D)) manufactured by Olympus Corp., calculating a retardation value (Re), and using the expression given below. The fiber for use in the measurement consists of five single yarns. Three points of retardation are measured at different locations per single yarn, and the average value thereof is calculated to determine a retardation value.

Specifically, the degree of orientation can be measured by a method described in Examples.

$$Re = \Delta n0 \times P \times d$$

Re: retardation value
$\Delta n0$: intrinsic birefringence of the molecule (PE: 0.066)
P: degree of orientation
d: sample thickness (thread diameter for the fiber)

[Thread Diameter]

The thread diameter of the ultra-high molecular weight polyethylene fiber of the present embodiment can be calculated using, for example, an optical system microscope (unit model: BX51TRF-6(D)) manufactured by Olympus Corp. The fiber for use in the measurement consists of five single yarns. Three points are measured at different locations per single yarn, and the average value thereof is calculated to determine a thread diameter. Specifically, the thread diameter can be measured by a method described in Examples.

The thread diameter of the ultra-high molecular weight polyethylene fiber of the present embodiment is preferably 10 μm or larger and 30 μm or smaller.

[Ti Content, Si Content, and Ash Content in Ultra-High Molecular Weight Polyethylene Fiber]

The titanium (Ti) content of the ultra-high molecular weight polyethylene fiber of the present embodiment is preferably 5 ppm or lower.

The silicon (Si) content of the ultra-high molecular weight polyethylene fiber of the present embodiment is preferably 0.1 ppm or higher and 50 ppm or lower.

The ash content of the ultra-high molecular weight polyethylene fiber of the present embodiment is preferably 100 ppm or lower. The ash content is the content of an inorganic additive in the ultra-high molecular weight polyethylene fiber.

The ultra-high molecular weight polyethylene fiber tends to have better thermal stability and long-term stability by adjusting the Ti and Si contents and the ash content in the ultra-high molecular weight polyethylene fiber to the respective ranges mentioned above.

Examples of the method for adjusting the Ti content, the Si content, and the ash content include a method using a Ziegler-Natta catalyst and a metallocene catalyst mentioned later in the production of the polyethylene serving as a raw material for the ultra-high molecular weight polyethylene fiber.

Specifically, the Ti content, the Si content, and the ash content can be measured by a method described in Examples.

[Polymerization Method for Polyethylene]

The polyethylene for use in the ultra-high molecular weight polyethylene fiber of the present embodiment is not particularly limited and is preferably produced using a general Ziegler-Natta catalyst and metallocene catalyst.

<Ziegler-Natta Catalyst>

The Ziegler-Natta catalyst is preferably a catalyst for olefin polymerization comprising a solid catalytic component [A] and an organic metal compound component [B], wherein the solid catalytic component [A] is produced by reacting an organic magnesium compound (A-1) represented by following formula 1 which is soluble in an inert hydrocarbon solvent with a titanium compound (A-2) represented by following formula 2:

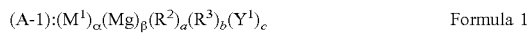

$$(\text{A-1}): (M^1)_\alpha (Mg)_\beta (R^2)_a (R^3)_b (Y^1)_c \quad \text{Formula 1}$$

wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N=C—$R^4$, $R^5$, —$SR^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and α, β, a, b, and c each represent a real number that satisfies the following relationships: 0≤α, 0<β, 0≤a, 0≤b, 0≤c, 0<a+b, 0≤c/(α+β)≤2, and nα+2β=a+b+c (wherein n represents the valence of $M^1$); and

$$(\text{A-2}): \text{Ti}(OR^7)_d X^1_{(4-d)} \quad \text{Formula 2}$$

wherein d represents a real number of 0 or larger and 4 or smaller; $R^7$ represents a hydrocarbon group having 1 or more and 20 or less carbon atoms; and $X^1$ represents a halogen atom.

Specific examples of the inert hydrocarbon solvent for use in the reaction between the compounds (A-1) and (A-2) include, but are not particularly limited to: aliphatic hydrocarbons such as pentane, hexane, and heptane; aromatic hydrocarbons such as benzene and toluene; and alicyclic hydrocarbons such as cyclohexane and methylcyclohexane.

First, the compound (A-1) will be described. The compound (A-1) is represented in the form of an organic magnesium complex compound soluble in an inert hydrocarbon solvent, and encompasses all of dihydrocarbyl magnesium compounds and their complexes with other metal compounds. The relational expression nα+2β=a+b+c of the symbols α, β, a, b, and c represents the stoichiometry of metal atom valence and substituents.

In formula 1, specific examples of the hydrocarbon group having 2 or more and 20 or less carbon atoms, represented by $R^2$ or $R^3$ include, but are not particularly limited to, alkyl groups, cycloalkyl groups, and aryl groups, for example, ethyl, propyl, butyl, pentyl, hexyl, octyl, decyl, cyclohexyl, and phenyl groups. Among them, alkyl groups are preferred. When α>0, a metal atom selected from the group consisting of groups 12, 13, and 14 of the periodic system can be used as the metal atom $M^1$. Examples thereof include zinc, boron, and aluminum. Among them, aluminum and zinc are preferred.

The ratio β/α of magnesium to the metal atom $M^1$ is not particularly limited and is preferably 0.1 or more and 30 or less, more preferably 0.5 or more and 10 or less. In the case of using a predetermined organic magnesium compound wherein α=0, for example, a compound wherein $R^2$ is 1-methylpropyl is soluble in an inert hydrocarbon solvent. Such a compound also brings about a preferred consequence to the present embodiment. It is recommended that $R^2$ and $R^3$ satisfy any one of the following three conditions (1), (2), and (3) in formula 1 wherein α=0.

Condition (1): at least one of $R^2$ and $R^3$ is a secondary or tertiary alkyl group having 4 or more and 6 or less carbon atoms, preferably both of $R^2$ and $R^3$ are alkyl groups having 4 or more and 6 or less carbon atoms and at least one of the groups is a secondary or tertiary alkyl group;

Condition (2): $R^2$ and $R^3$ are alkyl groups differing in the number of carbon atoms, preferably $R^2$ is an alkyl group having 2 or 3 carbon atoms and $R^3$ is an alkyl group having 4 or more carbon atoms; and Condition (3): at least one of $R^2$ and $R^3$ is a hydrocarbon group having 6 or more carbon atoms, preferably, an alkyl group wherein the total number of carbon atoms contained in $R^2$ and $R^3$ is 12 or more.

Hereinafter, these groups will be shown specifically. In Condition (1), specific examples of the secondary or tertiary alkyl group having 4 or more and 6 or less carbon atoms include 1-methylpropyl, 2-methylpropyl, 1,1-dimethylethyl, 2-methylbutyl, 2-ethylpropyl, 2,2-dimethylpropyl, 2-methylpentyl, 2-ethylbutyl, 2,2-dimethylbutyl, and 2-methyl-2-ethylpropyl groups. Among them, a 1-methylpropyl group is particularly preferred.

In Condition (2), specific examples of the alkyl group having 2 or 3 carbon atoms include ethyl, 1-methylethyl, and propyl groups. Among them, an ethyl group is particularly preferred. Specific examples of the alkyl group having 4 or more carbon atoms include, but are not particularly limited to, butyl, pentyl, hexyl, heptyl, and octyl groups. Among them, butyl and hexyl groups are particularly preferred.

In Condition (3), specific examples of the hydrocarbon group having 6 or more carbon atoms include, but are not particularly limited to, hexyl, heptyl, octyl, nonyl, decyl, phenyl, and 2-naphthyl groups. Among these hydrocarbon groups, alkyl groups are preferred. Among the alkyl groups, hexyl and octyl groups are particularly preferred.

According to general tendencies, an alkyl group containing a larger number of carbon atoms is more soluble in an inert hydrocarbon solvent and forms a solution having a higher viscosity. A moderate long chain alkyl group is therefore preferably used in terms of handling. The organic magnesium compound can be diluted, for use, with an inert hydrocarbon solvent. This solution can be used without any problem even if trace amounts of Lewis basic compounds such as ethers, esters, and amines are contained or remain therein.

Next, $Y^1$ will be described. In formula 1, $Y^1$ is any of alkoxy, siloxy, allyloxy, amino, amide, —N=C—$R^4$, $R^5$, —$SR^6$ (wherein $R^4$, $R^5$, and $R^6$ each independently represent a hydrocarbon group having 2 or more and 20 or less carbon atoms), and a β-keto acid residue.

In formula 1, the hydrocarbon group represented by $R^4$, $R^5$, or $R^6$ is preferably an alkyl or aryl group having 1 or more and 12 or less carbon atoms, particularly preferably an alkyl or aryl group having 3 or more and 10 or less carbon atoms. Examples of the hydrocarbon group include, but are not particularly limited to, methyl, ethyl, propyl, 1-methylethyl, butyl, 1-methylpropyl, 1,1-dimethylethyl, pentyl, hexyl, 2-methylpentyl, 2-ethylbutyl, 2-ethylpentyl, 2-ethylhexyl, 2-ethyl-4-methylpentyl, 2-propylheptyl, 2-ethyl-5-methyloctyl, octyl, nonyl, decyl, phenyl, and naphthyl groups. Among them, butyl, 1-methylpropyl, 2-methylpentyl and 2-ethylhexyl groups are particularly preferred.

In formula 1, $Y^1$ is preferably an alkoxy group or a siloxy group. Specific examples of the alkoxy group preferably include, but are not particularly limited to, methoxy, ethoxy, propoxy, 1-methylethoxy, butoxy, 1-methylpropoxy, 1,1-dimethylethoxy, pentoxy, hexoxy, 2-methylpentoxy, 2-ethylbutoxy, 2-ethylpentoxy, 2-ethylhexoxy, 2-ethyl-4-methylpentoxy, 2-propylheptoxy, 2-ethyl-5-methyloctoxy, octoxy, phenoxy, and naphthoxy groups. Among them, butoxy, 1-methylpropoxy, 2-methylpentoxy, and 2-ethylhexoxy groups are more preferred. Specific examples of the siloxy group preferably include, but are not particularly limited to, hydrodimethylsiloxy, ethylhydromethylsiloxy, diethylhydrosiloxy, trimethylsiloxy, ethyldimethylsiloxy, diethylmethylsiloxy, and triethylsiloxy groups. Among them, hydrodimethylsiloxy, ethylhydromethylsiloxy, diethylhydrosiloxy, and trimethylsiloxy groups are more preferred.

In the present embodiment, the compound (A-1) can be synthesized by any method without particular limitations and may be synthesized by reacting an organic magnesium compound selected from the group consisting of formulas $R^2MgX^1$ and $R^2Mg$ (wherein $R^2$ is as defined above, and $X^1$ represents halogen) with an organic metal compound selected from the group consisting of formulas $M^1R^3_n$ and $M^1R^3_{(n-1)}H$ (wherein $M^1$ and $R^3$ are as defined above, and n represents the valence of $M^1$) at 25° C. or higher and 150° C. or lower in an inert hydrocarbon solvent and, if necessary, subsequently with a compound represented by formula $Y^1$—H (wherein $Y^1$ is as defined above) or with an organic magnesium compound and/or an organic aluminum compound having a functional group represented by $Y^1$. In the approach of reacting the organic magnesium compound soluble in an inert hydrocarbon solvent with a compound represented by formula $Y^1$—H, the order in which the compounds are added to the reaction system is not particularly limited. Any of the following methods can be used: the compound represented by formula $Y^1$—H is added into the organic magnesium compound; the organic magnesium compound is added into the compound represented by formula $Y^1$—H; and both of the compounds are added at the same time.

In the present embodiment, the molar composition ratio $c/(\alpha+\beta)$ of $Y^1$ to all metal atoms in the compound (A-1) is $0 \leq c/(\alpha+\beta) \leq 2$, preferably $0 \leq c/(\alpha+\beta) < 1$. The compound (A-1) wherein the molar composition ratio of $Y^1$ to all metal atoms is 2 or less tends to have better reactivity with the compound (A-2).

Next, the compound (A-2) will be described. The compound (A-2) is a titanium compound represented by formula 2:

$$(A-2): Ti(OR^7)_d X^1_{(4-d)} \qquad \text{Formula 2}$$

wherein d represents a real number of 0 or larger and 4 or smaller; $R^7$ represents a hydrocarbon group having 1 or more and 20 or less carbon atoms; and $X^1$ represents a halogen atom.

In formula 2, d is preferably 0 or larger and 1 or smaller, more preferably 0. In formula 2, specific examples of the hydrocarbon group represented by $R^7$ include, but are not particularly limited to: aliphatic hydrocarbon groups such as methyl, ethyl, propyl, butyl, pentyl, hexyl, 2-ethylhexyl, heptyl, octyl, decyl, and allyl groups; alicyclic hydrocarbon groups such as cyclohexyl, 2-methylcyclohexyl, and cyclopentyl groups; and aromatic hydrocarbon groups such as phenyl and naphthyl groups. Among them, aliphatic hydrocarbon groups are preferred. Examples of the halogen represented by $X^1$ include chlorine, bromine, and iodine. Among them, chlorine is preferred. In the present embodiment, the compound (A-2) is most preferably titanium tetrachloride. In the present embodiment, two or more compounds selected from these compounds may be used as a mixture.

Next, the reaction between the compounds (A-1) and (A-2) will be described. The reaction is preferably carried out in an inert hydrocarbon solvent and more preferably carried out in an aliphatic hydrocarbon solvent such as hexane or heptane. In the reaction, the molar ratio between (A-1) and (A-2) is not particularly limited, and the molar ratio (Ti/Mg) of Ti atom contained in the compound (A-2) to Mg atom contained in the compound (A-1) is preferably 0.1 or more and 10 or less, more preferably 0.3 or more and 3 or less. The reaction temperature is not particularly limited and is preferably within the range of −80° C. or higher and 150° C. or lower, more preferably within the range of −40° C. to 100° C. The order in which the compounds (A-1) and (A-2) are added to the reaction system is not particularly limited. Any of the following methods can be used: the compound (A-2) is added subsequently to the compound (A-1); the compound (A-1) is added subsequently to the compound (A-2); and the compounds (A-1) and (A-2) are added at the same time. The method of adding the compounds (A-1) and (A-2) at the same time is preferred. In the present embodiment, the solid catalytic component [A] obtained by the reaction is used as a slurry solution with an inert hydrocarbon solvent.

Another example of the Ziegler-Natta catalytic component used in the present embodiment is preferably a catalyst for olefin polymerization comprising a solid catalytic component [C] and an organic metal compound component [B], wherein the solid catalytic component [C] is produced by reacting an organic magnesium compound (C-1) represented by formula 3 which is soluble in an inert hydrocarbon solvent with a chlorinating agent (C-2) represented by formula 4, and allowing an organic magnesium compound (C-4) represented by formula 5 which is soluble in an inert hydrocarbon solvent and a titanium compound (C-5) represented by formula 6 to be supported by a carrier (C-3) thus prepared:

$$(C-1): (M^2)_\gamma (Mg)_\delta (R^8)_e (R^9)_f (OR^{10})_g \qquad \text{Formula 3}$$

wherein $M^2$ represents a metal atom selected from the group consisting of groups 12, 13, and 14 of the periodic system; $R^8$, $R^9$, and $R^{10}$ each represent a hydrocarbon group having 2 or more and 20 or less carbon atoms; and γ, δ, e, f, and g each represent a real number that satisfies the following relationships: $0 \leq \gamma$, $0 < \delta$, $0 \leq e$, $0 \leq f$, $0 \leq g$, $0 < e+f$, $0 \leq g/(\gamma+\delta) \leq 2$, and $k\gamma + 2\delta = e+f+g$ (wherein k represents the valence of $M^2$);

$$(C-2): H_h SiCl_i R^{11}_{(4-(n+i))} \qquad \text{Formula 4}$$

wherein $R^{11}$ represents a hydrocarbon group having 1 or more and 12 or less carbon atoms; and h and i each represent a real number that satisfies the following relationships: $0 < h$, $0 < i$, and $0 < h+i \leq 4$;

$$(C-4): (M^1)_\alpha (Mg)_\beta (R^2)_a (R^3)_b Y^1_c \qquad \text{Formula 5}$$

wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N═C—$R^4$, $R^5$, —$SR^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and α, β, a, b, and c each represent a real number that satisfies the following relationships: $0 \leq \alpha$, $0<\beta$, $0\leq a$, $0\leq b$, $0\leq c$, $0<a+b$, $0\leq c/(\alpha+\beta)\leq 2$, and $n\alpha+2\beta=a+b+c$ (wherein n represents the valence of $M^1$); and (C-5):Ti(OR$^7$)$_d$X$^1_{(4-d)}$   Formula 6 wherein d represents a real number of 0 or larger and 4 or smaller; $R^7$ represents a hydrocarbon group having 1 or more and 20 or less carbon atoms; and $X^1$ represents a halogen atom.

First, the compound (C-1) will be described. The compound (C-1) is represented in the form of an organic magnesium complex compound soluble in an inert hydrocarbon solvent, but encompasses all of dihydrocarbyl magnesium compounds and their complexes with other metal compounds. In formula 3, the relational expression $k\gamma+2\delta=e+f+g$ of the symbols γ, δ, e, f, and g represents the stoichiometry of metal atom valence and substituents.

In the formula, specific examples of the hydrocarbon group represented by $R^8$ or $R^9$ include, but are not particularly limited to, alkyl groups, cycloalkyl groups, and aryl groups, for example, methyl, ethyl, propyl, butyl, pentyl, hexyl, octyl, decyl, cyclohexyl, and phenyl groups. Among them, alkyl groups are preferred for each of $R^8$ and $R^9$. When γ>0, a metal atom selected from the group consisting of groups 12, 13, and 14 of the periodic system can be used as the metal atom $M^2$. Examples thereof include zinc, boron, and aluminum. Among them, aluminum and zinc are particularly preferred.

The ratio δ/γ of magnesium to the metal atom $M^2$ is not particularly limited and is preferably 0.1 or more and 30 or less, more preferably 0.5 or more and 10 or less. In the case of using a predetermined organic magnesium compound wherein γ=0, for example, a compound wherein $R^8$ is 1-methylpropyl is soluble in an inert hydrocarbon solvent. Such a compound also brings about a preferred consequence to the present embodiment. It is recommended that $R^8$ and $R^9$ satisfy any one of the following three conditions (1), (2), and (3) in formula 3 wherein γ=0.

Condition (1): at least one of $R^8$ and $R^9$ is a secondary or tertiary alkyl group having 4 or more and 6 or less carbon atoms, preferably, both of $R^8$ and $R^9$ are alkyl groups having 4 or more and 6 or less carbon atoms and at least one of the groups is a secondary or tertiary alkyl group;

Condition (2): $R^8$ and $R^9$ are alkyl groups differing in the number of carbon atoms, preferably, $R^8$ is an alkyl group having 2 or 3 carbon atoms and $R^9$ is an alkyl group having 4 or more carbon atoms; and Condition (3): at least one of $R^8$ and $R^9$ is a hydrocarbon group having 6 or more carbon atoms, preferably, an alkyl group wherein the total number of carbon atoms contained in $R^8$ and $R^9$ is 12 or more.

Hereinafter, these groups will be shown specifically. In Condition (1), specific examples of the secondary or tertiary alkyl group having 4 or more and 6 or less carbon atoms include 1-methylpropyl, 2-methylpropyl, 1,1-dimethylethyl, 2-methylbutyl, 2-ethylpropyl, 2,2-dimethylpropyl, 2-methylpentyl, 2-ethylbutyl, 2,2-dimethylbutyl, and 2-methyl-2-ethylpropyl groups. Among them, a 1-methylpropyl group is particularly preferred.

In Condition (2), examples of the alkyl group having 2 or 3 carbon atoms include ethyl, 1-methylethyl, and propyl groups. Among them, an ethyl group is particularly preferred. Specific examples of the alkyl group having 4 or more carbon atoms, but are not particularly limited to, butyl, pentyl, hexyl, heptyl, and octyl groups. Among them, butyl and hexyl groups are particularly preferred.

In Condition (3), specific examples of the hydrocarbon group having 6 or more carbon atoms include, but are not particularly limited to, hexyl, heptyl, octyl, nonyl, decyl, phenyl, and 2-naphthyl groups. Among these hydrocarbon groups, alkyl groups are preferred. Among the alkyl groups, hexyl and octyl groups are particularly preferred.

According to general tendencies, an alkyl group containing a larger number of carbon atoms is more soluble in an inert hydrocarbon solvent and forms a solution having a higher viscosity. A moderately long-chain alkyl group is therefore preferably used in terms of handling. The organic magnesium compound is used as an inert hydrocarbon solution. This solution can be used without any problem even if trace amounts of Lewis basic compounds such as ethers, esters, and amines are contained or remain therein.

Next, the alkoxy group ($OR^{10}$) will be described. The hydrocarbon group represented by $R^{10}$ is preferably an alkyl or aryl group having 1 or more and 12 or less carbon atoms, particularly preferably an alkyl or aryl group having 3 or more and 10 or less carbon atoms. Specific examples of $R^{10}$ include, but are not particularly limited to, methyl, ethyl, propyl, 1-methylethyl, butyl, 1-methylpropyl, 1,1-dimethylethyl, pentyl, hexyl, 2-methylpentyl, 2-ethylbutyl, 2-ethylpentyl, 2-ethylhexyl, 2-ethyl-4-methylpentyl, 2-propylheptyl, 2-ethyl-5-methyloctyl, octyl, nonyl, decyl, phenyl, and naphthyl groups. Among them, butyl, 1-methylpropyl, 2-methylpentyl, and 2-ethylhexyl groups are particularly preferred.

In the present embodiment, the compound (C-1) can be synthesized by any method without particular limitations and is preferably synthesized by a method of reacting an organic magnesium compound selected from the group consisting of formulas $R^8MgX^1$ and $R^8Mg$ (wherein $R^8$ is as defined above, and $X^1$ represents a halogen atom) with an organic metal compound selected from the group consisting of formulas $M^2R^9_k$ and $M^2R^9_{(k-1)}H$ (wherein $M^2$, $R^9$, and k are as defined above) at a temperature of 25° C. or higher and 150° C. or lower in an inert hydrocarbon solvent and, if necessary, subsequently with an alcohol having a hydrocarbon group represented by $R^9$ (wherein $R^9$ is as defined above) or an alkoxy magnesium compound and/or an alkoxy aluminum compound having a hydrocarbon group represented by $R^9$ which is soluble in an inert hydrocarbon solvent.

In the approach of reacting the organic magnesium compound soluble in an inert hydrocarbon solvent with an alcohol, the order in which the compounds are added to the reaction system is not particularly limited. Any of the following methods can be used: the alcohol is added into the organic magnesium compound; the organic magnesium compound is added into the alcohol; and both of the compounds are added at the same time. In the present embodiment, the ratio between the organic magnesium compound soluble in an inert hydrocarbon solvent and the alcohol in the reaction is not particularly limited, and the molar composition ratio $g/(\gamma+\delta)$ of the alkoxy group to all metal atoms in the resulting alkoxy group-containing organic magnesium compound is $0\leq g/(\gamma+\delta)\leq 2$, preferably $0\leq g/(\gamma+\delta)<1$.

Next, the compound (C-2) will be described. The compound (C-2) is a silicon chloride compound having at least one Si—H bond, represented by formula 4:

(C-2): H$_h$SiCl$_i$R$^{11}_{(4-(h+i))}$   Formula 4 wherein $R^{11}$ represents s hydrocarbon group having 1 or more and 12 or less carbon atoms; and h and i each represent a real number that satisfies the following relationships: 0<h, 0<i, and 0<h+i≤4.

In formula 4, specific examples of the hydrocarbon group represented by $R^{11}$ include, but are not particularly limited to, aliphatic hydrocarbon groups, alicyclic hydrocarbon groups, and aromatic hydrocarbon groups, for example, methyl, ethyl, propyl, 1-methylethyl, butyl, pentyl, hexyl, octyl, decyl, cyclohexyl, and phenyl groups. Among them, alkyl groups having 1 or more and 10 or less carbon atoms are preferred, and alkyl groups having 1 to 3 carbon atoms, such as methyl, ethyl, propyl, and 1-methylethyl group are more preferred. Each of h and i is a number larger than 0 that satisfies the relationship h+i≤4. Preferably, i is 2 or larger and 3 or smaller.

Specific examples of such a compound include, but are not particularly limited to, $HSiCl_3$, $HSiCl_2CH_3$, $HSiCl_2C_2H_5$, $HSiCl_2(C_3H_7)$, $HSiCl_2(2\text{-}C_3H_7)$, $HSiCl_2(C_4H_9)$, $HSiCl_2(C_6H_5)$, $HSiCl_2(4\text{-}Cl\text{—}C_6H_4)$, $HSiCl_2(CH\text{=}CH_2)$, $HSiCl_2(CH_2C_6H_5)$, $HSiCl_2(1\text{-}C_{10}H_7)$, $HSiCl_2(CH_2CH\text{=}CH_2)$, $H_2SiCl(CH_3)$, $H_2SiCl(C_2H_5)$, $HSiCl(CH_3)_2$, $HSiCl(C_2H_5)_2$, $HSiCl(CH_3)(2\text{-}C_3H_7)$, $HSiCl(CH_3)(C_6H_5)$, and $HSiCl(C_6H_5)_2$. These silicon chloride compounds are used each alone or as a mixture of two or more types selected from these compounds. Among them, $HSiCl_3$, $HSiCl_2CH_3$, $HSiCl(CH_3)_2$, and $HSiCl_2(C_3H_7)$ are preferred, and $HSiCl_3$ and $HSiCl_2CH_3$ are more preferred.

Next, the reaction between the compounds (C-1) and (C-2) will be described. For the reaction, the compound (C-2) is preferably used after being diluted in advance with an inert hydrocarbon solvent, a chlorinated hydrocarbon (e.g., 1,2-dichloroethane, o-dichlorobenzene, or dichloromethane), an ether vehicle (e.g., diethyl ether or tetrahydrofuran), or a mixed vehicle thereof. Among them, an inert hydrocarbon solvent is more preferred in terms of the performance of the catalyst. The ratio between (C-1) and (C-2) in the reaction is not particularly limited and is preferably 0.01 mol or higher and 100 mol or lower, more preferably 0.1 mol or higher and 10 mol or lower, of silicon atom contained in the compound (C-2) with respect to 1 mol of magnesium atom contained in the compound (C-1).

The method for reacting the compounds (C-1) and (C-2) is not particularly limited. Any of the following methods can be used: the compounds (C-1) and (C-2) are reacted while introduced at the same time to a reactor (simultaneous addition method); a reactor is charged with the compound (C-2) in advance, and then, the compound (C-1) is introduced to the reactor; and a reactor is charged with the compound (C-1) in advance, and then, the compound (C-2) is introduced to the reactor. Among them, the method of charging a reactor with the compound (C-2) in advance and then introducing the compound (C-1) to the reactor is preferred. The carrier (C-3) obtained by the reaction is preferably separated by filtration or decantation and then thoroughly washed with an inert hydrocarbon solvent to remove unreacted materials or by-products, etc.

The temperature of the reaction between the compounds (C-1) and (C-2) is not particularly limited and is preferably 25° C. or higher and 150° C. or lower, more preferably 30° C. or higher and 120° C. or lower, further preferably 40° C. or higher and 100° C. or lower. In the simultaneous addition method in which the compounds (C-1) and (C-2) are reacted while introduced at the same time to a reactor, the reaction temperature is preferably adjusted to a predetermined temperature by preliminarily setting the temperature of the reactor to a predetermined temperature and adjusting the temperature in the reactor to a predetermined temperature while performing the simultaneous addition. In the method of charging a reactor with the compound (C-2) in advance and then introducing the compound (C-1) to the reactor, the reaction temperature is preferably adjusted to a predetermined temperature by adjusting the temperature of the reactor charged with the silicon chloride compound to a predetermined temperature and adjusting the temperature in the reactor to a predetermined temperature while introducing the organic magnesium compound to the reactor. In the method of charging a reactor with the compound (C-1) in advance and then introducing the compound (C-2) to the reactor, the reaction temperature is preferably adjusted to a predetermined temperature by adjusting the temperature of the reactor charged with the compound (C-1) to a predetermined temperature and adjusting the temperature in the reactor to a predetermined temperature while introducing the compound (C-2) to the reactor.

Next, the organic magnesium compound (C-4) will be described. The compound (C-4) is preferably represented by formula 5(C-4):

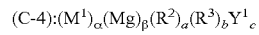

$$\text{(C-4)}:(M^1)_\alpha(Mg)_\beta(R^2)_a(R^3)_b Y^1_c \qquad \text{Formula 5}$$

wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N=C—$R^4$, $R^5$, —$SR^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and α, β, a, b, and c each represent a real number that satisfies the following relationships: 0≤α, 0<β, 0≤a, 0≤b, 0<a+b, 0≤c/(α+β)≤2, and nα+2β=a+b+c (wherein n represents the valence of W).

The amount of the compound (C-4) used is preferably 0.1 or more and 10 or less, more preferably 0.5 or more and 5 or less, in terms of the molar ratio of magnesium atom contained in the compound (C-4) to titanium atom contained in the compound (C-5).

The temperature of the reaction between the compounds (C-4) and (C-5) is not particularly limited and is preferably −80° C. or higher and 150° C. or lower, more preferably within the range of −40° C. or higher and 100° C. or lower.

The concentration of the compound (C-4) in use is not particularly limited and is preferably 0.1 mol/L or higher and 2 mol/L or lower, more preferably 0.5 mol/L or higher and 1.5 mol/L or lower, on the basis of titanium atom contained in the compound (C-4). An inert hydrocarbon solvent is preferably used for diluting the compound (C-4).

The order in which the compounds (C-4) and (C-5) are added to the carrier (C-3) is not particularly limited. Any of the following methods can be used: the compound (C-5) is added subsequently to the compound (C-4); the compound (C-4) is added subsequently to the compound (C-5); and the compounds (C-4) and (C-5) are added at the same time. Among them, the method of adding the compounds (C-4) and (C-5) at the same time is preferred. The reaction between the compounds (C-4) and (C-5) is carried out in an inert hydrocarbon solvent, preferably in an aliphatic hydrocarbon solvent such as hexane or heptane. The catalyst thus obtained is used as a slurry solution with an inert hydrocarbon solvent.

Next, the compound (C-5) will be described. In the present embodiment, the compound (C-5) is a titanium compound represented by formula 6:

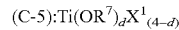

$$\text{(C-5)}:Ti(OR^7)_d X^1_{(4-d)} \qquad \text{Formula 6}$$

wherein d represents a real number of 0 or larger and 4 or smaller; $R^7$ represents a hydrocarbon group having 1 or more and 20 or less carbon atoms; and $X^1$ represents a halogen atom.

In formula 6, specific examples of the hydrocarbon group represented by $R^7$ include, but are not particularly limited to: aliphatic hydrocarbon groups such as methyl, ethyl, propyl, butyl, pentyl, hexyl, 2-ethylhexyl, heptyl, octyl, decyl, and allyl groups; alicyclic hydrocarbon groups such as cyclohexyl, 2-methylcyclohexyl, and cyclopentyl groups; and aromatic hydrocarbon groups such as phenyl and naphthyl groups. Among them, aliphatic hydrocarbon groups are preferred. Specific examples of the halogen represented by $X^1$ include, but are not particularly limited to, chlorine, bromine, and iodine. Among them, chlorine is preferred. One compound selected from these compounds may be used alone as the compound (C-5), or two or more compounds selected from these compounds may be used as a mixture.

The amount of the compound (C-5) used is not particularly limited and is preferably 0.01 or more and 20 or less, particularly preferably 0.05 or more and 10 or less, in terms of the molar ratio to magnesium atom contained in the carrier (C-3).

The reaction temperature for the compound (C-5) is not particularly limited and is preferably −80° C. or higher and 150° C. or lower, more preferably within the range of −40° C. or higher and 100° C. or lower.

In the present embodiment, the method for allowing the compound (C-5) to be supported by the carrier (C-3) is not particularly limited and may involve reacting an excess of the compound (C-5) with the carrier (C-3) or using a third component to efficiently support the compound (C-5). A method of achieving this supporting through the reaction between the compound (C-5) and the organic magnesium compound (C-4) is preferred.

Next, the organic metal compound component [B] in the present embodiment will be described. The solid catalytic component in the present embodiment can serve as a highly active catalyst for polymerization by combination with the organic metal compound component [B]. The organic metal compound component [B] is also called a "promoter." The organic metal compound component [B] is preferably a compound containing a metal selected from the group consisting of groups 1, 2, 12, and 13 of the periodic system, particularly preferably an organic aluminum compound and/ or an organic magnesium compound.

Compounds represented by formula 7 are preferably used each alone or as a mixture as the organic aluminum compound:

$$AlR^{12}_j Z^1_{(3-j)} \quad \text{Formula 7}$$

wherein $R^{12}$ represents a hydrocarbon group having 1 or more and 20 or less carbon atoms; $Z^1$ represents a group selected from the group consisting of hydrogen, halogen, alkoxy, allyloxy, and siloxy groups; and j represents any number of 2 or larger and 3 or smaller.

In formula 7, specific examples of the hydrocarbon group having 1 or more and 20 or less carbon atoms, represented by $R^{12}$ include, but are not particularly limited to, aliphatic hydrocarbons, aromatic hydrocarbons, and alicyclic hydrocarbons. Preferred examples of the hydrocarbon group include: trialkyl aluminum compounds such as trimethyl aluminum, triethyl aluminum, tripropyl aluminum, tributyl aluminum, tri(2-methylpropyl) aluminum (or triisobutyl aluminum), tripentyl aluminum, tri(3-methylbutyl) aluminum, trihexyl aluminum, trioctyl aluminum, and tridecyl aluminum; aluminum halide compounds such as diethyl aluminum chloride, ethyl aluminum dichloride, bis(2-methylpropyl) aluminum chloride, ethyl aluminum sesquichloride, and diethyl aluminum bromide; alkoxy aluminum compounds such as diethyl aluminum ethoxide and bis(2-methylpropyl) aluminum butoxide; siloxy aluminum compounds such as dimethylhydrosiloxy aluminum dimethyl, ethylmethylhydrosiloxy aluminum diethyl, and ethyldimethylsiloxy aluminum diethyl; and mixtures thereof. Among them, trialkyl aluminum compounds are particularly preferred.

The organic magnesium compound is preferably an organic magnesium compound represented by formula 3 which is soluble in an inert hydrocarbon solvent:

$$(M^2)_\gamma(Mg)_\delta(R^8)_e(R^9)_f(OR^{10})_g \quad \text{Formula 3}$$

wherein $M^2$ represents a metal atom selected from the group consisting of groups 12, 13, and 14 of the periodic system; $R^8$, $R^9$, and $R^{10}$ each represent a hydrocarbon group having 2 or more and 20 or less carbon atoms; and γ, δ, e, f, and g each represent a real number that satisfies the following relationships: $0 \leq \gamma$, $0 < \delta$, $0 \leq e$, $0 \leq f$, $0 \leq g$, $0 < e+f$, $0 \leq g/(\gamma+\delta) \leq 2$, and $k\gamma+2\delta=e+f+g$ (wherein k represents the valence of $M^2$).

This organic magnesium compound is represented in the form of an organic magnesium complex compound soluble in an inert hydrocarbon solvent, but encompasses all of dialkyl magnesium compounds and their complexes with other metal compounds. Although γ, δ, e, f, g, $M^2$, $R^8$, $R^9$, and $OR^{10}$ are as already defined, this organic magnesium compound is preferably a compound wherein the ratio δ/γ is in the range of 0.5 to 10 and $M^2$ is aluminum because a compound having higher solubility in an inert hydrocarbon solvent is more preferred.

As for the method for adding the solid catalytic component and the organic metal compound component [B] into a polymerization system placed under polymerization conditions, these components may be separately added into the polymerization system, or the components may be reacted in advance and then added into the polymerization system. For the addition, it is preferred to add the components from the upper inner portion of the polymerization system. This is because the addition of the catalytic components from the upper portion of the polymerization system tends to decrease the bulk density of 53 μm or smaller polyethylene powders and allows the flow energy relationship described above according to the present embodiment to be more easily satisfied. The ratio between the components to be combined is not particularly limited and is preferably 1 mmol or higher and 3,000 mmol or lower of the organic metal compound component [B] with respect to 1 g of the solid catalytic component.

<Metallocene Catalyst>

A general transition metal compound is used in cases using the metallocene catalyst. Examples of these cases include a production method described in Japanese Patent No. 4868853. Such a metallocene catalyst is constituted by: two catalytic components of a) a transition metal compound having a cyclic η-binding anionic ligand and b) an activating agent capable of forming a complex that exerts catalytic activity through reaction with the transition metal compound.

The transition metal compound having a cyclic η-binding anionic ligand used in the present embodiment can be represented by, for example, following formula (1):

$$L^1_j W k M^3 X^2_p X^3_q \quad \text{Formula (1)}$$

In formula (1), each $L^1$ independently represents a cyclic η-binding anionic ligand selected from the group consisting of a cyclopentadienyl group, an indenyl group, a tetrahydroindenyl group, a fluorenyl group, a tetrahydrofluorenyl group, and an octahydrofluorenyl group, and this ligand optionally has 1 to 8 substituents, wherein the substituents each independently represent a substituent having up to 20 non-hydrogen atoms, selected from the group consisting of hydrocarbon groups having 1 to 20 carbon atoms, halogen atoms, halogen-substituted hydrocarbon groups having 1 to 12 carbon atoms, aminohydrocarbyl groups having 1 to 12 carbon atoms, hydrocarbyloxy groups having 1 to 12 carbon atoms, dihydrocarbylamino groups having 1 to 12 carbon atoms, hydrocarbylphosphino groups having 1 to 12 carbon atoms, a silyl group, an aminosilyl group, hydrocarbyloxysilyl groups having 1 to 12 carbon atoms, and halosilyl groups.

In formula (1), $M^3$ represents a transition metal selected from transition metal groups belonging to group 4 of the periodic system, wherein the formal oxidation number is +2, +3, or +4, and this transition metal is bonded to at least one ligand $L^1$ via $\eta^5$ bond.

In formula (1), W represents a divalent substituent having up to 50 non-hydrogen atoms, and this divalent substituent monovalently binds to each of $L^1$ and $M^3$ and thereby forms a metallacycle in collaboration with $L^1$ and $M^3$. Each $X^2$ independently represents an anionic σ-binding type ligand having up to 60 non-hydrogen atoms, selected from a monovalent anionic σ-binding type ligand, a divalent anionic σ-binding type ligand divalently binding to $M^3$, and a divalent anionic σ-binding type ligand monovalently binding to each of $L^1$ and $M^3$.

In formula (1), each $X^2$ independently represents a neutral Lewis base-coordinating compound having up to 40 non-hydrogen atoms, and $X^3$ represents a neutral Lewis base-coordinating compound.

j is 1 or 2 provided that when j is 2, two ligands $L^1$ are optionally bonded to each other via a divalent group having up to 20 non-hydrogen atoms, wherein the divalent group is a group selected from the group consisting of hydrocarbadiyl groups having 1 to 20 carbon atoms, halohydrocarbadiyl groups having 1 to 12 carbon atoms, hydrocarbyleneoxy groups having 1 to 12 carbon atoms, hydrocarbyleneamino groups having 1 to 12 carbon atoms, a silanediyl group, halosilanediyl groups, and a silyleneamino group.

k is 0 or 1. p is 0, 1, or 2 provided that: when $X^2$ is a monovalent anionic σ-binding type ligand or a divalent anionic σ-binding type ligand binding to $L^1$ and $M^3$, p is an integer smaller by at least 1 than the formal oxidation number of $M^3$; and when $X^2$ is a divalent anionic σ-binding type ligand binding only to $M^3$, p is an integer smaller by at least (j+1) than the formal oxidation number of $M^3$. q is 0, 1, or 2.

Examples of the ligand $X^2$ in the compound of formula (1) include halides, hydrocarbon groups having 1 to 60 carbon atoms, hydrocarbyloxy groups having 1 to 60 carbon atoms, hydrocarbylamide groups having 1 to 60 carbon atoms, hydrocarbyl phosphide groups having 1 to 60 carbon atoms, hydrocarbyl sulfide groups having 1 to 60 carbon atoms, a silyl group, and combinations thereof.

Examples of the neutral Lewis base-coordinating compound $X^3$ in the compound of formula (1) include phosphines, ethers, amines, olefins having 2 to 40 carbon atoms, dienes having 1 to 40 carbon atoms, and divalent groups induced from these compounds.

In the present embodiment, the transition metal compound having a cyclic η-binding anionic ligand is preferably a transition metal compound represented by formula (1) wherein j=1. Preferred examples of the compound represented by formula (1) wherein j=1 include compounds represented by following formula (2):

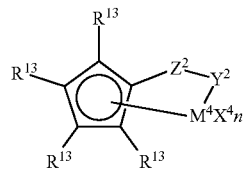

Formula (2)

In formula (2), $M^4$ represents a transition metal selected from the group consisting of titanium, zirconium, nickel, and hafnium, wherein the formal oxidation number of the transition metal is +2, +3, or +4. Each $R^{13}$ independently represents a hydrogen atom or a substituent having up to 20 non-hydrogen atoms, selected from the group consisting of hydrocarbon groups having 1 to 8 carbon atoms, a silyl group, a germyl group, a cyano group, halogen atoms, and combinations thereof provided that when the substituent $R^{13}$ is a hydrocarbon group having 1 to 8 carbon atoms, a silyl group, or a germyl group, two adjacent substituents $R^{13}$ are optionally bonded to each other to form a divalent group, which can form a ring in collaboration with the bond between two carbon atoms of the cyclopentadienyl ring bonded to these two adjacent substituents $R^{13}$, respectively.

In formula (2), each $X^4$ independently represents a substituent having up to 20 non-hydrogen atoms, selected from the group consisting of halides, hydrocarbon groups having 1 to 20 carbon atoms, hydrocarbyloxy groups having 1 to 18 carbon atoms, hydrocarbylamino groups having 1 to 18 carbon atoms, a silyl group, hydrocarbylamide groups having 1 to 18 carbon atoms, hydrocarbyl phosphide groups having 1 to 18 carbon atoms, hydrocarbyl sulfide groups having 1 to 18 carbon atoms, and combinations thereof provided that two substituents $X^4$ can optionally form in collaboration a neutral conjugate diene having 4 to 30 carbon atoms or a divalent group.

In formula (2), $Y^2$ represents —O—, —S—, —NR*—, or —PR*— wherein R* represents a hydrogen atom, a hydrocarbon group having 1 to 12 carbon atoms, a hydrocarbyloxy group having 1 to 8 carbon atoms, a silyl group, an alkyl halide group having 1 to 8 carbon atoms, an aryl halide group having 6 to 20 carbon atoms, or a combination thereof.

In formula (2), $Z^2$ represents $SiR^*_2$, $CR^*_2$, $SiR^*_2SiR^*_2$, $CR^*_2CR^*_2$, $CR^*{=}CR^*$, $CR^*_2SiR^*_2$, or $GeR^*_2$ wherein R* is as defined above. n is 1, 2, or 3.

Examples of the transition metal compound having a cyclic η-binding anionic ligand used in the present embodiment include compounds as shown below. Specific examples of the zirconium compounds include, but are not particularly limited to, bis(methylcyclopentadienyl)zirconium dimethyl, bis(n-butylcyclopentadienyl)zirconium dimethyl, bis(indenyl)zirconium dimethyl, bis(1,3-dimethylcyclopentadienyl)zirconium dimethyl, (pentamethylcyclopentadienyl) (cyclopentadienyl)zirconium dimethyl, bis(cyclopentadienyl)zirconium dimethyl, bis(pentamethylcyclopentadienyl)zirconium dimethyl, bis(fluorenyl)zirconium dimethyl, ethylenebis(indenyl)zirconium dimethyl, ethylenebis(4,5,6,7-tetrahydro-1-indenyl)zirconium dimethyl, ethylenebis(4-methyl-1-indenyl)zirconium dimethyl, ethylenebis(5-methyl-1-indenyl)zirconium dimethyl, ethylenebis(6-methyl-1-indenyl)zirconium dimethyl, ethylenebis(7-methyl-1-indenyl)zirconium dimethyl, ethylenebis(5-methoxy-1-indenyl)zirconium dimethyl, ethylenebis(2,3-dimethyl-1-indenyl)zirconium dimethyl, ethylenebis(4,7-dimethyl-1-indenyl)

zirconium dimethyl, ethylenebis-(4,7-dimethoxy-1-indenyl) zirconium dimethyl, methylenebis(cyclopentadienyl) zirconium dimethyl, isopropylidene(cyclopentadienyl) zirconium dimethyl, isopropylidene(cyclopentadienyl-fluorenyl)zirconium dimethyl, silylenebis(cyclopentadienyl) zirconium dimethyl, and dimethylsilylene (cyclopentadienyl)zirconium dimethyl.

Specific examples of the titanium compounds include, but are not particularly limited to, [(N-t-butylamido) (tetramethyl-η5-cyclopentadienyl)-1,2-ethanediyl]titanium dimethyl, [(N-t-butylamido) (tetramethyl-η5-cyclopentadienyl)dimethylsilane]titanium dimethyl, [(N-methylamido) (tetramethyl-η5-cyclopentadienyl)dimethylsilane]titanium dimethyl, [(N-phenylamido) (tetramethyl-η5-cyclopentadienyl)dimethylsilane]titanium dimethyl, [(N-benzylamido) (tetramethyl-η5-cyclopentadienyl)dimethylsilane]titanium dimethyl, [(N-t-butylamido) (η5-cyclopentadienyl)-1,2-ethanediyl]titanium dimethyl, [(N-t-butylamido) (η5-cyclopentadienyl)dimethylsilane]titanium dimethyl, [(N-methylamido) (η5-cyclopentadienyl)-1,2-ethanediyl]titanium dimethyl, [(N-methylamido) (η5-cyclopentadienyl)dimethylsilane]titanium dimethyl, [(N-t-butylamido) (η5-indenyl)dimethylsilane]titanium dimethyl, and [(N-benzylamido) (η5-indenyl)dimethylsilane]titanium dimethyl.

Specific examples of the nickel compounds include, but are not particularly limited to, dibromobistriphenylphosphine nickel, dichlorobistriphenylphosphine nickel, dibromodiacetonitrile nickel, dibromodibenzonitrile nickel, dibromo(1,2-bisdiphenylphosphinoethane)nickel, dibromo(1,3-bisdiphenylphosphinopropane)nickel, dibromo(1,1'-diphenylbisphosphinoferrocene)nickel, dimethylbisdiphenylphosphine nickel, dimethyl(1,2-bisdiphenylphosphinoethane)nickel, methyl(1,2-bisdiphenylphosphinoethane)nickel tetrafluoroborate, (2-diphenylphosphino-1-phenylethyleneoxy)phenylpyridine nickel, dichlorobistriphenylphosphine palladium, dichlorodibenzonitrile palladium, dichlorodiacetonitrile palladium, dichloro(1,2-bisdiphenylphosphinoethane)palladium, bistriphenylphosphine palladium bistetrafluoroborate, and bis(2,2'-bipyridine)methyl iron tetrafluoroborate etherate.

Specific examples of the hafnium compounds include, but are not particularly limited to, [(N-t-butylamido) (tetramethyl-η5-cyclopentadienyl)-1,2-ethanediyl]hafnium dimethyl, [(N-t-butylamido) (tetramethyl-η5-cyclopentadienyl)dimethylsilane]hafnium dimethyl, [(N-methylamido) (tetramethyl-η5-cyclopentadienyl)dimethylsilane]hafnium dimethyl, [(N-phenylamido) (tetramethyl-η5-cyclopentadienyl)dimethylsilane]hafnium dimethyl, [(N-benzylamido) (tetramethyl-η5-cyclopentadienyl)dimethylsilane]hafnium dimethyl, [(N-t-butylamido) (η5-cyclopentadienyl)-1,2-ethanediyl]hafnium dimethyl, [(N-t-butylamido) (η5-cyclopentadienyl)dimethylsilane]hafnium dimethyl, [(N-methylamido) (η5-cyclopentadienyl)-1,2-ethanediyl]hafnium dimethyl, [ (N-methylamido) (η5-cyclopentadienyl)dimethylsilane]hafnium dimethyl, [(N-t-butylamido) (η5-indenyl)dimethylsilane]hafnium dimethyl, and [(N-benzylamido) (η5-indenyl)dimethylsilane]hafnium dimethyl.

Specific examples of the transition metal compound having a cyclic η-binding anionic ligand used in the present embodiment further include compounds named by the replacement of the moiety "dimethyl" (which appears at the end of the name of each compound, i.e., immediately after the moiety "zirconium" or "titanium", and corresponds to the moiety of $X^4$ in formula (2)) in the name of each zirconium compound or titanium compound listed above with, for example, any of "dichloro", "dibromo", "diiodo", "diethyl", "dibutyl", "diphenyl", "dibenzyl", "2-(N,N-dimethylamino)benzyl", "2-butene-1,4-diyl", "s-trans-η4-1,4-diphenyl-1,3-butadiene", "s-trans-η4-3-methyl-1,3-pentadiene", "s-trans-η4-1,4-dibenzyl-1,3-butadiene", "s-trans-η4-2,4-hexadiene", "s-trans-η4-1,3-pentadiene", "s-trans-η4-1,4-ditolyl-1,3-butadiene", "s-trans-η4-1,4-bis(trimethylsilyl)-1,3-butadiene", "s-cis-η4-1,4-diphenyl-1,3-butadiene", "s-cis-η4-3-methyl-1,3-pentadiene", "s-cis-η4-1,4-dibenzyl-1,3-butadiene", "s-cis-η4-2,4-hexadiene", "s-cis-η4-1,3-pentadiene", "s-cis-η4-1,4-ditolyl-1,3-butadiene", and "s-cis-η4-1,4-bis(trimethylsilyl)-1,3-butadiene".

The transition metal compound having a cyclic η-binding anionic ligand used in the present embodiment can be synthesized by a method generally known in the art. In the present embodiment, these transition metal compounds may be used alone or in combination.

Next, the activating agent b) capable of forming a complex that exerts catalytic activity through reaction with the transition metal compound (hereinafter, also simply referred to as an "activating agent") used in the present embodiment will be described.

Examples of the activating agent according to the present embodiment include compounds represented by following formula (3):

　　　　　　Formula (3)

wherein $[L^2-H]^{d+}$ represents a proton-donating Bronsted acid wherein $L^2$ represents a neutral Lewis base, and d represents an integer of 1 to 7; and $[M^5{}_mQ_p]^{d-}$ represents a compatible non-coordinating anion wherein $M^5$ represents a metal belonging to any of groups 5 to 15 of the periodic system, or a metalloid, each Q is independently selected from the group consisting of hydrides, halides, dihydrocarbylamide groups having 2 to 20 carbon atoms, hydrocarbyloxy groups having 1 to 30 carbon atoms, hydrocarbon groups having 1 to 30 carbon atoms, and substituted hydrocarbon groups having 1 to 40 carbon atoms wherein the number of the halide represented by Q is 1 or less, m represents an integer of 1 to 7, p represents an integer of 2 to 14, and d is as defined above provided that p−m=d.

Specific examples of the non-coordinating anion include, but are not particularly limited to, tetrakisphenyl borate, tri(p-tolyl) (phenyl) borate, tris(pentafluorophenyl) (phenyl) borate, tris(2,4-dimethylphenyl) (phenyl) borate, tris(3,5-dimethylphenyl) (phenyl) borate, tris(3,5-di-trifluoromethylphenyl) (phenyl) borate, tris(pentafluorophenyl) (cyclohexyl) borate, tris(pentafluorophenyl) (naphthyl) borate, tetrakis(pentafluorophenyl) borate, triphenyl(hydroxyphenyl) borate, diphenyl-di(hydroxyphenyl) borate, triphenyl(2,4-dihydroxyphenyl) borate, tri(p-tolyl) (hydroxyphenyl) borate, tris(pentafluorophenyl) (hydroxyphenyl) borate, tris(2,4-dimethylphenyl) (hydroxyphenyl) borate, tris(3,5-dimethylphenyl) (hydroxyphenyl) borate, tris(3,5-di-trifluoromethylphenyl) (hydroxyphenyl) borate, tris(pentafluorophenyl) (2-hydroxyethyl) borate, tris(pentafluorophenyl) (4-hydroxybutyl) borate, tris(pentafluorophenyl) (4-hydroxy-cyclohexyl) borate, tris(pentafluorophenyl) (4-(4'-hydroxyphenyl)phenyl) borate, and tris(pentafluorophenyl) (6-hydroxy-2-naphthyl) borate.

Other preferred examples of the non-coordinating anion include borates derived from the borates listed above by the replacement of the hydroxy group with a NHR group wherein R is preferably a methyl group, an ethyl group, or a tert-butyl group.

Specific examples of the proton-donating Bronsted acid include, but are not particularly limited to: trialkyl group-substituted ammonium cations such as triethylammonium, tripropylammonium, tri(n-butyl)ammonium, trimethylammonium, tributylammonium, and tri(n-octyl)ammonium; N,N-dialkylanilinium cations such as N,N-dimethylanilinium, N,N-diethylanilinium, N,N-2,4,6-pentamethylanilinium, and N,N-dimethylbenzylanilinium; dialkylammonium cations such as di-(i-propyl)ammonium and dicyclohexylammonium; triarylphosphonium cations such as triphenylphosphonium, tri(methylphenyl)phosphonium, and tri(dimethylphenyl)phosphonium; and dimethylsulfonium, diethylsulfonium, and diphenylsulfonium.

In the present embodiment, an organic metal oxy compound having unit represented by following formula (4) may be used as the activating agent:

$$\pm M^6 R^{14}_{n-2}-O\pm_m \quad \text{Formula (4)}$$

wherein $M^6$ represents a metal belonging to any of groups 13 to 15 of the periodic system, or a metalloid, each $R^{14}$ independently represents a hydrocarbon group having 1 to 12 carbon atoms or a substituted hydrocarbon group, n represents the valence of the metal $M^6$, and m represents an integer of 2 or larger.

As a preferred example, the activating agent of the present embodiment is, for example, an organic aluminum oxy compound comprising a unit represented by following formula (5):

$$\pm AlR^{15}-O\pm_m \quad \text{Formula (5)}$$

wherein $R^{15}$ represents an alkyl group having 1 to 8 carbon atoms, and m represents an integer of 2 to 60.

As a more preferred example, the activating agent of the present embodiment is, for example, a methylaluminoxane comprising a unit represented by following formula (6):

$$\pm Al(CH_3)-O\pm_m \quad \text{Formula (6)}$$

wherein m represents an integer of 2 to 60.

In the present embodiment, these activating agent components may be used alone or in combination.

In the present embodiment, such a catalytic component may be used as a supported catalyst in which the component is supported by a solid component. Such a solid component is not particularly limited and is specifically, for example, at least one inorganic solid material selected from: porous polymer materials such as polyethylene, polypropylene, and styrene-divinylbenzene copolymers; inorganic solid materials having an element belonging to any of groups 2, 3, 4, 13, and 14 of the periodic system, such as silica, alumina, magnesia, magnesium chloride, zirconia, titania, boron oxide, calcium oxide, zinc oxide, barium oxide, vanadium pentaoxide, chromium oxide, and thorium oxide, and mixtures thereof; and complex oxides thereof.

Specific examples of the complex oxides of silica include, but are not particularly limited to, complex oxides of silica and an element of group 2 or 13 of the periodic system, such as silica-magnesia and silica-alumina. In the present embodiment, in addition to the two catalytic components mentioned above, an organic aluminum compound can be used, if necessary, as a catalytic component. The organic aluminum compound that can be used in the present embodiment is, for example, a compound represented by following formula (7):

$$AlR^{16}_n X^5_{3-n} \quad \text{Formula (7)}$$

wherein $R^{16}$ represents an alkyl group having 1 to 12 carbon atoms or an aryl group having 6 to 20 carbon atoms, $X^5$ represents halogen, hydrogen, or an alkoxyl group, wherein the alkyl group is linear, branched, or cyclic, and n represents an integer of 1 to 3.

In this context, the organic aluminum compound may be a mixture of compounds represented by formula (7). In the organic aluminum compound that can be used in the present embodiment, examples of $R^{16}$ in the formula include a methyl group, an ethyl group, a butyl group, an isobutyl group, a hexyl group, an octyl group, a decyl group, a phenyl group, and a tolyl group. Examples of $X^5$ in the formula include a methoxy group, an ethoxy group, a butoxy group, and chloro.

Specific examples of the organic aluminum compound that can be used in the present embodiment include, but are not particularly limited to, trimethyl aluminum, triethyl aluminum, tributyl aluminum, triisobutyl aluminum, trihexyl aluminum, trioctyl aluminum, tridecyl aluminum, diethyl aluminum hydride, dibutyl aluminum hydride, and diisobutyl aluminum hydride. Alternatively, a mixture thereof may be used. Alternative examples of the organic aluminum compound that can be used in the present embodiment include reaction products of these organic aluminums and alcohols such as methyl alcohol, ethyl alcohol, butyl alcohol, pentyl alcohol, hexyl alcohol, octyl alcohol, and decyl alcohol, for example, dimethyl methoxy aluminum, dimethyl ethoxy aluminum, and dibutyl butoxy aluminum.

[Method for Producing Polyethylene]

The ultra-high molecular weight polyethylene fiber of the present embodiment can be produced from a polyethylene. The form of the polyethylene is not particularly limited and is preferably a polyethylene powder.

Examples of the polymerization method for the polyethylene in the method for producing the polyethylene powder include methods for (co)polymerizing ethylene or monomers including ethylene by a suspension polymerization or vapor-phase polymerization method. Among them, the suspension polymerization method is preferred because this method can efficiently remove polymerization heat. In the suspension polymerization method, an inert hydrocarbon vehicle can be used as a vehicle. The olefin itself can also be used as a solvent.

Specific examples of such an inert hydrocarbon vehicle can include, but are not particularly limited to: aliphatic hydrocarbons such as propane, butane, isobutane, pentane, isopentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethyl chloride, chlorobenzene, and dichloromethane; and mixtures thereof.

In the method for producing the polyethylene powder, the polymerization temperature is usually 30° C. or higher and 100° C. or lower. The polymerization temperature is preferably 40° C. or higher, more preferably 50° C. or higher and preferably 95° C. or lower, more preferably 90° C. or lower. The polymerization temperature equal to or higher than 30° C. tends to realize efficient industrial production. On the other hand, the polymerization temperature equal to or lower than 100° C. tends to realize continuous stable operation.

In the method for producing the polyethylene powder, the polymerization pressure is usually atmospheric pressure or higher and 2 MPa or lower. The polymerization pressure is preferably 0.1 MPa or higher, more preferably 0.12 MPa or higher and preferably 1.5 MPa or lower, more preferably 1.0 MPa or lower. The polymerization pressure equal to or higher than atmospheric pressure tends to realize efficient industrial production. On the other hand, the polymerization pressure equal to or lower than 2 MPa tends to suppress partial heat generation ascribable to rapid polymerization reaction during the introduction of a catalyst, and realize stable polyethylene production.

The polymerization reaction can be carried out by any of batch, semicontinuous, and continuous methods. Continuous polymerization is preferred. A partial high-temperature state ascribable to rapid ethylene reaction can be suppressed by continuously supplying ethylene gas, a solvent, a catalyst, etc., into the polymerization system while continuously discharging them together with produced polyethylenes. Thus, the polymerization system is further stabilized. Ethylene reaction in a homogeneous state in the polymerization system prevents the formation of branches, double bonds and/or the like in polymer chains and is less likely to cause reduction in molecular weight and/or cross-linking of polyethylenes. The resulting polyethylene powder decreases unmelted matter remaining when melted or dissolved, is prevented from being colored, and is less likely to present problems such as reduced mechanical properties. Accordingly, the continuous method, which achieves a more homogeneous polymerization system, is preferred.

Alternatively, the polymerization may be carried out at two or more stages differing in reaction conditions. The intrinsic viscosity of the resulting polyethylene can also be adjusted by the presence of hydrogen in the polymerization system or by the change of the polymerization temperature, as described in, for example, the specification of West German Patent Application Publication No. 3127133. The addition of hydrogen as a chain transfer agent into the polymerization system can control the intrinsic viscosity within a proper range. In the case of adding hydrogen into the polymerization system, the mole fraction of the hydrogen is preferably 0 mol % or more and 30 mol % or less, more preferably 0 mol % or more and 25 mol % or less, further preferably 0 mol % or more and 20 mol % or less. In the present embodiment, in addition to each component as mentioned above, other components known in the art to be useful in polyethylene production can be included.

For the polymerization for the polyethylene, an antistatic agent such as Stadis 450 manufactured by The Associated Octel Company Ltd. (agent: Maruwa Bussan K.K.) may be used for suppressing the adherence of polymers to a polymerization reactor. Stadis 450 may be diluted with an inert hydrocarbon vehicle and then added to the polymerization reactor through a pump or the like. The amount of this dilution added is preferably in the range of 0.10 ppm or higher and 20 ppm or lower, more preferably in the range of 0.20 ppm or higher and 10 ppm or lower, with respect to the amount of the polyethylene produced per unit time.

[Additive]

The polyethylene powder of the present embodiment can be supplemented, if necessary, with an additive such as a slip agent, a neutralizer, an antioxidant, a light stabilizer, an antistatic agent, or a pigment.

Examples of the slip agent or the neutralizer include, but are not particularly limited to, aliphatic hydrocarbons, higher fatty acids, higher fatty acid metal salts, fatty acid esters of alcohols, waxes, higher fatty acid amides, silicone oil, and rosin. The content of the slip agent or the neutralizer is not particularly limited and is 5000 ppm or lower, preferably 4000 ppm or lower, more preferably 3000 ppm or lower.

The antioxidant is not particularly limited and is preferably, for example, a phenol compound or a phenol-phosphorus compound. Specific examples of the antioxidant include: phenol antioxidants such as 2,6-di-t-butyl-4-methylphenol(dibutylhydroxytoluene), n-octadecyl-3-(4-hydroxy-3,5-di-t-butylphenyl)propionate, and tetrakis(methylene (3,5-di-t-butyl-4-hydroxyhydrocinnamate))methane; phenol-phosphorus antioxidants such as 6-[3-(3-t-butyl-4-hydroxy-5-methylphenyl)propoxy]-2,4,8,10-tetra-t-butyldibenzo[d,f][1,3,2]dioxaphosphepin; and phosphorus antioxidants such as tetrakis(2,4-di-t-butylphenyl)-4,4'-biphenylene-di-phosphonite, tris(2,4-di-t-butylphenyl)phosphite, and cyclic neopentane tetraylbis(2,4-t-butylphenyl phosphite).

The amount of the antioxidant in the polyethylene powder according to the present embodiment is 100 ppm or higher and 5000 ppm or lower, preferably 100 ppm or higher and 4000 ppm or lower, more preferably 100 ppm or higher and 3000 ppm or lower. The polyethylene powder containing 100 ppm or higher of the antioxidant is less susceptible to embrittlement, discoloration, reduction in mechanical properties, etc., because of the suppressed degradation of the polyethylene, resulting in better long-term stability. The antioxidant contained in an amount of 5000 ppm or lower can suppress coloration ascribable to the antioxidant itself or a modified form of the antioxidant or coloration caused by the reaction of the antioxidant with the metal components.

Examples of the light stabilizer include, but are not particularly limited to: benzotriazole light stabilizers such as 2-(5-methyl-2-hydroxyphenyl)benzotriazole and 2-(3-t-butyl-5-methyl-2-hydroxyphenyl)-5-chlorobenzotriazole; and hindered amine light stabilizers such as bis(2,2,6,6-tetramethyl-4-piperidine)sebacate and poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]. The content of the light stabilizer is not particularly limited and is 5000 ppm or lower, preferably 3000 ppm or lower, more preferably 2000 ppm or lower.

Examples of the antistatic agent include, but are not particularly limited to, aluminosilicate, kaolin, clay, natural silica, synthetic silica, silicates, talc, diatomaceous earth, and glycerin fatty acid ester.

[Method for Producing Ultra-High Molecular Weight Polyethylene Fiber]

The method for producing the ultra-high molecular weight polyethylene fiber of the present embodiment will be described below.

First, an antioxidant is added, if necessary, to the polyethylene powder, and a solvent is added thereto to prepare a liquid in a slurry form.

Examples of the antioxidant include, but are not particularly limited to: phenol antioxidants such as 2,6-di-t-butyl-4-methylphenol(dibutylhydroxytoluene), n-octadecyl-3-(4-hydroxy-3,5-di-t-butylphenyl)propionate, and tetrakis (methylene (3,5-di-t-butyl-4-hydroxyhydrocinnamate)) methane; phenol-phosphorus antioxidants such as 6-[3-(3-t-butyl-4-hydroxy-5-methylphenyl)propoxy]-2,4,8,10-tetra-t-butyldibenzo[d,f][1,3,2]dioxaphosphepin; and phosphorus antioxidants such as tetrakis(2,4-di-t-butylphenyl)-4,4'-biphenylene-di-phosphonite, tris(2,4-di-t-butylphenyl)phosphite, and cyclic neopentane tetraylbis(2,4-t-butylphenyl phosphite). Among them, n-octadecyl-3-(4-hydroxy-3,5-di-t-butylphenyl)propionate is preferred.

The amount of the antioxidant added to the polyethylene powder is preferably 300 to 800 ppm, more preferably 400 to 700 ppm, further preferably 500 to 600 ppm, with respect to the total amount of the polyethylene powder and the antioxidant.

The solvent is not limited as long as the solvent is suitable for spinning. Examples thereof include hydrocarbons having a boiling point exceeding 100° C. at atmospheric pressure. Specific examples of the solvent include: aliphatic, alicyclic, and aromatic hydrocarbons; halogenated hydrocarbons such as dichlorobenzene; and mixtures thereof.

The solvent may be a solvent having a boiling point of at least approximately 180° C. at atmospheric pressure. Examples of the solvent include halogenated hydrocarbons, mineral oil, liquid paraffin, decalin, tetralin, naphthalene, xylene, toluene, dodecane, undecane, decane, nonane, octene, cis-decahydronaphthalene, trans-decahydronaphthalene, low-molecular-weight polyethylene waxes, and mixtures thereof. Among them, mineral oil, decalin, and a mixture thereof are preferred.

The mixing ratio between the polyethylene powder and the solvent is preferably 85 wt % or more and 95 wt % or less of the polyethylene powder and 5 wt % or more and 15 wt % or less of the solvent and is adjusted such that the total of the polyethylene powder and the solvent is 100 wt %.

Next, the liquid in a slurry form is introduced into an extruder.

After the preparation of a slurry form of a mixed liquid of the polyethylene powder, the solvent, the antioxidant, etc., it is preferred to completely replace a gas present in the powder with the solvent by vacuum deaeration, followed by introduction into an extruder. It is more preferred to vacuum-deaerate the liquid in a slurry form with stirring in the slurry form at 80° C. or higher for 1 hour or longer, followed by introduction into an extruder.

It is preferred to adjust an oxygen concentration to 0.1% or lower by performing kneading of the liquid in a slurry form in an extruder under nitrogen, and to introduce 10% or more and 50% or less of the amount of the solvent to be introduced to an extruder, from the intermediate portion between a die and a slurry introduction site in the extruder using a side feed. It is also preferred to introduce the solvent to be introduced using a side feed, in a state heated to 100° C. or higher and 200° C. or lower The extruder into which the liquid in a slurry form is introduced may be any extruder. Examples thereof include twin screw extruders such as intermeshing co-rotating twin screw extruders.

The gel spinning process may involve extruding the liquid in a slurry form in an extruder to form a mixture, preferably a homogeneous mixture, of the polyethylene powder and the solvent. The formation of the mixture by the extrusion of the slurry may be performed at a temperature higher than the melting temperature of the polyethylene powder. Thus, the mixture of the polyethylene powder and the spinning solvent formed in the extruder may be a liquid mixture of the melted polyethylene powder and the spinning solvent. The temperature at which the liquid mixture of the melted polyethylene powder and the spinning solvent is formed in the extruder is 140° C. or higher and 320° C. or lower, preferably 200° C. or higher and 300° C. or lower, more preferably 220° C. or higher and 280° C. or lower. The melt retention time within the extruder is 5 minutes or longer and 30 minutes or shorter, preferably 10 minutes or longer and 25 minutes or shorter, more preferably 15 minutes or longer and 20 minutes or shorter.

The homogeneous solution thus obtained is spun through a spinneret. The temperature of the spinneret is 140° C. or higher and 250° C. or lower, preferably 150° C. or higher and 200° C. or lower, more preferably 150° C. or higher and 180° C. or lower. The discharge rate is preferably 0.5 g/min or more and 2.0 g/min or less. The pore size of the spinneret is preferably 0.3 mm or larger and 1.5 mm or smaller.

Next, the discharged thread containing the solvent is charged into a water bath of 5° C. or higher and 15° C. or lower via an air gap of 3 to 5 cm and wound while rapidly cooled. The winding rate is 20 m/min or more and 50 m/min or less, preferably 25 m/min or more and 45 m/min or less, more preferably 30 m/min or more and 40 m/min or less.

Subsequently, the solvent is removed from the thread. The method for removing the solvent differs depending on the type of the spinning solution. For example, decalin is removed by drying in vacuum under conditions of 40° C. and 24 hours or longer, and liquid paraffin is removed by dipping the thread in a solvent such as hexane, followed by extraction operation and subsequent drying in vacuum for 24 hours or longer.

The obtained thread is brought into contact with a metal heater such that the temperature of the thread reaches 100° C. or higher and 140° C. or lower. The thread is primarily drawn, and the drawn thread is wound. Subsequently, the drawn thread is brought into contact with a metal heater such that the temperature of the drawn thread reaches 140° C. or higher and 160° C. or lower. The thread is further secondarily drawn. The draw ratio immediately before breakage of the thread is used as a critical draw ratio. A break test, a creep resistance test, and the confirmation of shape retention were carried out using the thread drawn until the critical draw ratio.

[Creep Life]

The creep life is indicated by the time for the polyethylene fiber to break by dangling a weight having 30% load of polyethylene fiber breaking stress under a high-temperature condition of 70° C. It is preferred that the ultra-high molecular weight polyethylene fiber of the present embodiment should not break for at least 72 hours.

In the present embodiment, the creep life is measured by dangling a weight having 30% load of polyethylene fiber breaking stress under a high-temperature condition of 70° C., and measuring the time for the polyethylene fiber to break

EXAMPLES

Hereinafter, the present invention will be described more specifically with reference to Examples and Comparative Examples. However, the present invention is not intended to be limited by Examples below by any means.

[Methods and Conditions for Measuring Physical Properties]

The physical properties of polyethylene fibers of Examples and Comparative Examples were measured by the following methods.

(1) Viscosity-Average Molecular Weight (Mv)

1) 10 mg of each polyethylene fiber was weighed and charged into a test tube.

2) 20 mL of decalin (decahydronaphthalene) was charged into the test tube.

3) The polyethylene was dissolved by stirring at 150° C. for 2 hours.

4) The falling time (ts) between gauges of the solution was measured in a thermostat bath of 135° C. using an Ubbelohde-type viscometer.

5) The falling time (ts) between gauges of 5 mg of the polyethylene fiber was measured in the same way as above.

6) The falling time (tb) of decalin alone was measured as a blank without the addition of the polyethylene fiber.

7) The reduced viscosity ($\eta sp/C$) of each polyethylene fiber determined according to the expression given below was plotted to obtain a linear equation of the concentration (C) and the reduced viscosity (ηsp/C) of the polyethylene fiber. The intrinsic viscosity (η) extrapolated to the concentration 0 of the polyethylene fiber was determined.

$$\eta sp/C=(ts/tb-1)/0.1$$

8) The viscosity-average molecular weight (Mv) was determined from this intrinsic viscosity (η) according to the following expression.

$$Mv=(5.34\times10^4)\times[\eta]^{1.49}$$

(2) Measurement of Melting Peak and Quantity of Heat of Melting (ΔH)

The melting peaks and the quantity of heat of melting (ΔH) of each ultra-high molecular weight polyethylene fiber in Examples and Comparative Examples were measured using a differential scanning calorimeter Pyris 1 (trade name) manufactured by PerkinElmer, Inc. The melting peaks were determined on the basis of peaks in a melting curve obtained by keeping 8.4 mg of a sample at 50° C. for 1 minute, and then heating the sample to 180° C. at a rate of 10° C./min. The quantity of heat of melting (ΔH) was determined by further dividing the total quantity of heat calculated from the whole crystal peak area ($\Delta H_1$) in the melting curve by the weight of the sample.

(3) Measurement of Thread Diameter

The thread diameter of each ultra-high molecular weight polyethylene fiber in Examples and Comparative Examples was calculated using an optical system microscope (unit model: BX51TRF-6(D)) manufactured by Olympus Corp. The fiber for use in the measurement consisted of five single yarns. Three points were measured at different locations per single yarn, and the average value thereof was calculated to determine a thread diameter.

(4) Measurement of Degree of Orientation

The degree of orientation of each ultra-high molecular weight polyethylene fiber in Examples and Comparative Examples was calculated by installing a Berek compensator (unit model: U-CBE) manufactured by Olympus Corp. in an optical system microscope (unit model: BX51TRF-6(D)) manufactured by Olympus Corp., calculating a retardation value (Re), and using the expression given below. The fiber for use in the measurement consisted of five single yarns. Three points of the degree of orientation (hereinafter, also referred to as retardation) were measured at different locations per single yarn, and the average value thereof was calculated to determine a retardation value.

$$Re=\Delta n0\times P\times d$$

Re: retardation value
Δn0: intrinsic birefringence of the molecule (PE: 0.066)
P: degree of orientation
d: sample thickness (thread diameter for the fiber)

(5) Comonomer Content (Content of α-Olefin Unit)

The % content (mol %) of a polymerization unit derived from an α-olefin in an ultrahigh-molecular-weight ethylene copolymer powder was measured in accordance with the method disclosed in G. J. Ray et al., Macromolecules, 10, 773 (1977). The content of the α-olefin unit was calculated from the integrated intensity of methylene carbon signals obtained in a $^{13}$C-NMR spectrum.

Measurement apparatus: ECS-400 manufactured by JEOL Ltd.
Observation nucleus: $^{13}$C
Observation frequency: 100.53 MHz
Pulse width: 45° (7.5 μsec)
Pulse program: single pulse dec
PD: 5 sec
Measurement temperature: 130° C.
The number of scans: 30,000 or more
Reference: PE (-eee-) signal which is 29.9 ppm
Solvent: o-dichlorobenzene-d4
Sample concentration: 5 to 10 wt %
Dissolution temperature: 130 to 140° C.

(6) Ti Content

Each fiber was pressure-decomposed using a microwave decomposition apparatus (model ETHOS TC, manufactured by Milestone General K.K.). The element concentrations of the metal titanium in the fiber was measured by the internal standard method using ICP-MS (inductively coupled plasma-mass spectrometer, model X Series X7, manufactured by ThermoFisher Scientific K.K.).

(7) Si Content

Each fiber was pressure-decomposed using a microwave decomposition apparatus (model ETHOS TC, manufactured by Milestone General K.K.). The element concentrations of the metal silicon in the fiber was measured by the internal standard method using ICP-MS (inductively coupled plasma-mass spectrometer, model X Series X7, manufactured by ThermoFisher Scientific K.K.).

(8) Ash Content (Residual Catalyst Ash (Total Content of Al, Mg, Ti, Zr, Cr, Si and Cl))

0.2 g of a sample was weighed into a Teflon® decomposition container, to which highly pure nitric acid was then added. The mixture was pressure-decomposed using a microwave decomposition apparatus ETHOS-TC manufactured by Milestone General K.K. Then, the whole amount was adjusted to 50 mL with pure water purified in an ultrapure water production apparatus manufactured by Nihon Millipore K.K. The resultant was used as a test solution. Al, Mg, Ti, Zr, Cr, Si and Cl in the test solution were quantified by the internal standard method using an inductively coupled plasma-mass spectrometer (ICP-MS) X series 2 manufactured by ThermoFisher Scientific K.K.

(9) Mw/Mn

To 20 mg of polyethylene, 15 mL of o-dichlorobenzene was added, and the mixture was stirred at 150° C. for 1 hour to prepare a sample solution, which was then measured by gel permeation chromatography (GPC) under conditions described below. From the measurement results, the number-average molecular weight (Mn), the weight-average molecular weight (Mw), and the molecular weight distribution (Mw/Mn) were determined on the basis of a calibration curve prepared using commercially available monodisperse polystyrene.

Apparatus: 150-C ALC/GPC manufactured by Waters Corp.
Detector: RI detector
Mobile phase: o-dichlorobenzene (for high-performance liquid chromatograph)
Flow rate: 1.00 mL/min
Column: one Shodex AT-807S (manufactured by Showa Denko K.K.) connected with two columns of TSK-gel GMH-H6 (manufactured by Tosoh Corp.)
Column temperature: 140° C.

(10) Creep Resistance (Creep Life)

The creep resistance of each ultra-high molecular weight polyethylene fiber in Examples and Comparative Examples was calculated as the time for the thread to break by stretching the thread drawn to the breaking limit, at a temperature of 70° C. under 30% load of breaking stress.

(Evaluation Criteria)

⊚ represents being very good and means that the time to break was 72 hours or longer.

○ represents being good and means that the time to break was 24 hours or longer and shorter than 72 hours.

X represents being poor and means that the time to break was shorter than 24 hours.

(11) Strength

The strength of each ultra-high molecular weight polyethylene fiber in Examples and Comparative Examples was breaking strength and was calculated by pulling the thread drawn to the breaking limit, at room temperature until break, and dividing the highest load value thus applied to the thread by fineness. The fineness is a weight per $1 \times 10^4$ m of the thread, and its unit is dtex.

(Evaluation Criteria)

⊚ represents being very good and means that the breaking strength was 30 cN/dtex or more.

○ represents being good and means that the breaking strength was 20 cN/dtex or more and less than 30 cN/dtex.

X represents being poor and means that the breaking strength was less than 20 cN/dtex.

(12) Rate of Shape Retention

The rate of shape retention of a strand of several single yarns in bundle of each ultra-high molecular weight polyethylene fiber in Examples and Comparative Examples was evaluated by the following method: 10 single yarns cut into a length of 30 cm were rotated 10 times in the same direction, and whether or not the strand was raveled was evaluated.

(Evaluation Criteria)

⊚ represents being very good and means that the shape was retained without raveling the strand, i.e., the strand of 10 single yarns retained its shape as one thread.

X represents being poor and means that the shape was unable to be retained due to the raveling of the strand, i.e., the shape was not retained due to the disintegration of the strand of 10 single yarns.

(13) High-Speed Winding

The winding rate of each ultra-high molecular weight polyethylene fiber in Examples and Comparative Examples was evaluated from the winding rate after an exit from an extruder. The highest speed at which the thread was windable without break was compared.

(Evaluation Criteria)

⊚ represents being very good and means that the winding rate was 30 m/min or more.

○ represents being good and means that the winding rate was 20 m/min or more and less than 30 m/min.

X represents being poor and means that the winding rate was less than 20 m/min.

[Method for Synthesizing Catalyst]

Reference Example 1: Catalyst Synthesis Example 1

Preparation of Solid Catalytic Component [A]

To an 8 L stainless autoclave purged with nitrogen, 1,600 mL of hexane was added. To this autoclave, 800 mL of a hexane solution containing 1.5 mol/L titanium tetrachloride and 800 mL of a hexane solution containing 0.8 mol/L organic magnesium compound represented by compositional formula $AlMg_5(C_4H_9)_{11}(OSiH)_2$ were added at the same time over 4 hours with stirring at 10° C. After the addition, the mixture was gradually heated, and the reaction was continued at 10° C. for 1.5 hour. After the completion of the reaction, 1,600 mL of the supernatant was removed, and the resulting solid was washed with 1,600 mL of hexane ten times to prepare solid catalytic component [A]. The amount of titanium contained per g of this solid catalytic component was 3.20 mmol.

Reference Example 2: Catalyst Synthesis Example 2

Preparation of Supported Metallocene Catalytic Component [B]

Spherical silica having an average particle size of 20 μm, a surface area of 600 m$^2$/g, and an intra-particle pore volume of 1.5 mL/g was fired at 500° C. for 5 hours in the nitrogen atmosphere for dehydration. The amount of surface hydroxy groups on the dehydrated silica was 1.80 mmol/g per $SiO_2$. In a 1.8 L autoclave, 40 g of this dehydrated silica was dispersed in 800 mL of hexane in the nitrogen atmosphere to obtain slurry. While the temperature of the obtained slurry was kept at 50° C. with stirring, 80 mL of a hexane solution of triethyl aluminum (concentration: 1 mol/L) was added thereto. Then, the mixture was stirred for 3 hours such that the triethyl aluminum was reacted with the surface hydroxy groups of the silica to obtain component [a] containing triethyl aluminum-treated silica (in which the surface hydroxy groups of the triethyl aluminum-treated silica were capped by the triethyl aluminum) and a supernatant. Then, the supernatant in the obtained reaction mixture was removed by decantation to remove unreacted triethyl aluminum in the supernatant. Then, an appropriate amount of hexane was added to the resulting silica to obtain 850 mL of hexane slurry of triethyl aluminum-treated silica.

Meanwhile, [(N-t-butylamido) (tetramethyl-$\eta^5$-cyclopentadienyl)dimethylsilane]titanium-1,3-pentadiene (hereinafter, referred to as a "titanium complex") was dissolved at 200 mmol in 1000 mL of Isopar E (trade name of hydrocarbon mixture manufactured by Exxon Chemical Co., Inc. (US)). To this solution, 20 mL of a hexane solution containing 1 mol/L compound of formula $AlMg_6(C_2H_5)_3(n-C_4H_9)_{12}$ synthesized in advance from triethyl aluminum and dibutyl magnesium was added. The titanium complex concentration was adjusted to 0.1 mol/L by the addition of hexane to obtain component [b].

Bis(hydrogenated tallow alkyl)methylammonium-tris (pentafluorophenyl) (4-hydroxyphenyl) borate (hereinafter, referred to as a "borate") (5.7 g) was added to 50 mL of toluene and dissolved therein to obtain a 100 mmol/L toluene solution of the borate. To this toluene solution of the borate, 5 mL of a hexane solution containing 1 mol/L ethoxydiethyl aluminum was added at room temperature. The borate concentration in the solution was adjusted to 70 mmol/L by the addition of hexane. Then, the mixture was stirred at room temperature for 2 hours to obtain a reaction mixture containing the borate.

To 800 mL of the slurry of the component [a] obtained above, 46 mL of this reaction mixture containing the borate was added with stirring at 15 to 20° C. to allow the borate to be supported by the silica. In this way, slurry of the borate-supported silica was obtained. To this slurry, 32 mL of the component [b] obtained above was further added, and the mixture was stirred for 4 hours such that the titanium complex was reacted with the borate. In this way, supported metallocene catalyst [B] containing silica with a catalytic active species formed thereon, and a supernatant was obtained.

Then, the supernatant in the obtained reaction mixture was removed by decantation to remove unreacted triethyl aluminum in the supernatant.

Example 1

(Polymerization Step for Polyethylene)

Hexane, ethylene, hydrogen, and the solid catalytic component [A] were continuously supplied to a vessel-type polymerization reactor equipped with a stirring apparatus. A polyethylene (ethylene homopolymer) was produced at a rate of 10 kg/hr. The hydrogen was used at 99.99% by mol or more after being purified by the contact with a molecular sieve. The solid catalytic component [A] was added, together with 10 NL/hr of the hydrogen (NL represents normal liter (volume in terms of a normal state)), from the intermediate portion between the surface of the solution in the polymerization reactor and the bottom of the reactor at a rate of 0.15 mmol/L using the solvent hexane as a transporting solution such that the production rate was 10 kg/hr. The solid catalytic component [A] was also adjusted to 10° C. and added from the bottom of the polymerization reactor at a rate of 0.2 g/hr, while triisobutyl aluminum was adjusted to 22° C. and added from the bottom of the polymerization reactor at a rate of 5 mmol/hr. The catalytic activity was 11,000 g-PE/g-solid catalytic component [A]. The internal humidity of the polymerization reactor was kept at 0 ppm. The hexane was adjusted to 20° C. and supplied to the polymerization reactor at a rate of 60 L/hr. The ethylene was supplied from the bottom of the polymerization reactor to keep the polymerization pressure at 0.8 MPa. The polymer slurry was continuously discharged into a flash drum having a pressure of 0.05 MPa such that the level of the polymerization reactor was kept constant to separate unreacted ethylene. The polymer slurry was continuously sent to a centrifuge such that the level of the flash drum was kept constant to separate the polymer from the other materials such as the solvent. In this operation, the content of the materials such as the solvent contained in the polyethylene powder was 10% by mass with respect to the weight of the polyethylene powder. The separated polyethylene powder was dried at 70° C. for 5 hours. In this drying step, steam was sprayed onto the powder after the polymerization to deactivate the catalyst and the promoter. The obtained polyethylene powder was passed through a sieve having an aperture size of 425 μm such that particles that failed to pass through the sieve were removed to obtain a polyethylene powder of Example 1.

(Step of Producing Ultra-High Molecular Weight Polyethylene Fiber)

Decalin (manufactured by Hiroshima Wako Co., Ltd.) (5% by mass) was added into the polyethylene powder of Example 1 (95% by mass) supplemented with 500 ppm of n-octadecyl-3-(4-hydroxy-3,5-di-t-butylphenyl)propionate as an antioxidant to prepare a liquid in a slurry form. Next, the prepared liquid in a slurry form was vacuum-deaerated with stirring at 80° C. for 1 hour to completely replace a gas in the powder with the solvent (decalin), followed by introduction into an extruder. The oxygen concentration was adjusted to 0.1% or lower by performing kneading in the extruder under nitrogen. 15% by weight of the solvent (decalin) with respect to the total amount to be introduced into the extruder was introduced from the intermediate portion between a die and a slurry introduction site in the extruder using a side feed. The solvent (decalin) to be introduced using a side feed was introduced in a state heated to 100° C.

An intermeshing co-rotating twin screw extruder was used as the extruder to be provided with the slurry. The homogeneous solution thus obtained was spun through a spinneret (pore size: 0.5 mm) heated to 150° C. The discharge rate was 1.5 g/min. Next, the discharged thread containing the solvent was charged into a water bath of 10° C. via an air gap of 4 cm and wound while rapidly cooled. The winding rate was 35 m/min.

Next, the obtained thread was dried in vacuum under conditions of 40° C. and 24 hours to remove the solvent (decalin).

Finally, the thread from which the solvent (decalin) was removed was brought into contact with a metal heater such that the temperature of the thread reached 120° C. The thread was primarily drawn at a draw ratio of ×5, and the drawn thread was wound. Subsequently, the drawn thread was brought into contact with a metal heater such that the temperature of the drawn thread reached 150° C. The thread was further secondarily drawn. The draw ratio immediately before breakage of the thread was used as a critical draw ratio. The critical draw ratio was ×50. The physical properties of the obtained polyethylene fiber are shown in Table 1.

Example 2

A polyethylene fiber of Example 2 was obtained in the same way as in Example 1 except that 1-butene was introduced at 6.3 mol % with respect to ethylene from a gas phase. The physical properties of the obtained polyethylene fiber are shown in Table 1.

Example 3

(Polymerization Step for Polyethylene)

Hexane, ethylene, hydrogen, and the supported metallocene catalytic component [B] were continuously supplied to a vessel-type polymerization reactor equipped with a stirring apparatus. A polyethylene (ethylene homopolymer) was produced at a rate of 13 kg/hr. The hydrogen was used at 99.99% by mol or more after being purified by the contact with a molecular sieve. The supported metallocene catalytic component [B] was added, together with 15 NL/hr of the hydrogen (NL represents normal liter (volume in terms of a normal state)), from the intermediate portion between the surface of the solution in the polymerization reactor and the bottom of the reactor at a rate of 0.16 mmol/L using the solvent hexane as a transporting solution such that the production rate was 13 kg/hr. The supported metallocene catalytic component [B] was also adjusted to 12° C. and added from the bottom of the polymerization reactor at a rate of 0.2 g/hr, while triisobutyl aluminum was adjusted to 22° C. and added from the intermediate portion of the polymerization reactor at a rate of 5 mmol/hr. The catalytic activity was 11,000 g-PE/g-supported metallocene catalytic component [B]. The polymerization temperature was kept at 60° C. The internal humidity of the polymerization reactor was kept at 0 ppm. The hexane was adjusted to 20° C. and supplied from the bottom of the polymerization reactor at a rate of 60 L/hr. The ethylene was supplied from the bottom of the polymerization reactor to keep the polymerization pressure at 0.8 MPa. The polymer slurry was continuously discharged into a flash drum having a pressure of 0.05 MPa such that the level of the polymerization reactor was kept constant to separate unreacted ethylene. The polymer slurry was continuously sent to a centrifuge such that the level of the flash drum was kept constant to separate the polymer from the other materials such as the solvent. In this operation, the content of the materials such as the solvent contained in the polyethylene powder was 10% by mass with respect to the weight of the polyethylene powder. The separated polyethylene powder was dried with nitrogen blowing at 100° C. In this drying step, steam was sprayed onto the powder after the polymerization to deactivate the catalyst and the promoter. The obtained polyethylene powder was passed through a sieve having an aperture size of 425 μm such that particles that failed to pass through the sieve were removed to obtain a polyethylene powder of Example 3.
(Step of Producing Ultra-High Molecular Weight Polyethylene Fiber)

The polyethylene powder of Example 3 was spun by the method described in Example 1. The physical properties of the obtained polyethylene fiber are shown in Table 1.

Example 4

A polyethylene fiber of Example 4 was obtained in the same way as in Example 3 except that propylene was introduced at 0.40 mol % with respect to ethylene from a gas phase. The physical properties of the obtained polyethylene fiber are shown in Table 1.

Example 5

A polyethylene fiber of Example 5 was obtained in the same way as in Example 4 except that the polymerization temperature was changed to 80° C. The physical properties of the obtained polyethylene fiber are shown in Table 1.

Comparative Example 1

The polyethylene powder obtained in Example 2 was spun under spinning conditions described in the step described below to obtain an ultra-high molecular weight polyethylene fiber of Comparative Example 1. The physical properties of the obtained polyethylene fiber are shown in Table 1.
(Step of Producing Ultra-High Molecular Weight Polyethylene Fiber)

Decalin (manufactured by Hiroshima Wako Co., Ltd.) (5% by mass) was added into the polyethylene powder of Example 2 (95% by mass) supplemented with 500 ppm of n-octadecyl-3-(4-hydroxy-3,5-di-t-butylphenyl)propionate as an antioxidant to prepare a liquid in a slurry form. Next, the prepared liquid in a slurry form was introduced into an extruder.

An intermeshing co-rotating twin screw extruder was used as the extruder to be provided with the slurry. The homogeneous solution thus obtained was spun through a spinneret (pore size: 0.5 mm) heated to 150° C. The discharge rate was 0.7 g/min. Next, the discharged thread containing the solvent was charged into a water bath of 10° C. via an air gap of 4 cm and wound while rapidly cooled. The winding rate was 18 m/min.

Subsequently, the obtained thread was dried in vacuum under conditions of 40° C. and 24 hours to remove the solvent (decalin).

Finally, the thread from which the solvent (decalin) was removed was brought into contact with a metal heater such that the temperature of the thread reached 120° C. The thread was primarily drawn at a draw ratio of ×5, and the drawn thread was wound. Subsequently, the drawn thread was brought into contact with a metal heater such that the temperature of the drawn thread reached 150° C. The thread was further secondarily drawn. The draw ratio immediately before breakage of the thread was used as a critical draw ratio. The critical draw ratio was ×20. The physical properties of the obtained polyethylene fiber are shown in Table 1.

Comparative Example 2

The polyethylene powder obtained in Example 3 was spun under the spinning conditions described in Comparative Example 1 to obtain an ultra-high molecular weight polyethylene fiber of Comparative Example 2. The physical properties of the obtained polyethylene fiber are shown in Table 1.

Comparative Example 3

A polyethylene powder of Comparative Example 3 was obtained in the same way as in Example 4 except that the polymerization temperature was changed to 50° C. The obtained polyethylene powder was spun under the spinning conditions described in Comparative Example 1 to obtain an ultra-high molecular weight polyethylene fiber of Comparative Example 3. The physical properties of the obtained polyethylene fiber are shown in Table 1.

TABLE 1

|  | Example | | | | | Comparative Example | | |
| --- | --- | --- | --- | --- | --- | --- | --- | --- |
|  | 1 | 2 | 3 | 4 | 5 | 1 | 2 | 3 |
| Polyethylene | Homo | Copoly | Homo | Copoly | Copoly | Copoly | Homo | Copoly |
| Viscosity-average molecular weight (×10$^4$) | 450 | 480 | 920 | 940 | 150 | 480 | 920 | 1200 |
| Mw/Mn | 8.6 | 8.7 | 4.6 | 4.6 | 4.5 | 8.7 | 4.6 | 4.7 |
| The number of melting peaks | 3 | 3 | 3 | 3 | 4 | 2 | 2 | 3 |
| Difference between melting peak temperatures (II) − (I) (° C.) | 7 | 6 | 8 | 7 | 9 | 11 | 12 | 11 |
| Ratio of area ($\Delta H_2$) at or below (I) peak temperature of melting peak appearing between 140° C. or higher and lower than 150° C. to area ($\Delta H_1$) of whole melting peak (%) | 25.9 | 26.2 | 28.2 | 28.9 | 20.1 | 35.6 | 36.2 | 38.6 |
| Ratio of area ($\Delta H_3$) at or above (III) peak temperature of melting peak appearing between 158° C. or higher and 170° C. or lower to area ($\Delta H_1$) of whole melting peak (%) | 7.8 | 8.9 | 7.2 | 8.9 | 5.4 | 4.1 | No peak | 4.8 |
| Comonomer content (mol %) | 0 | 0.08 | 0 | 0.18 | 0.10 | 0.08 | 0 | 0.19 |
| Titanium content (ppm) | 3 | 3 | 1 | 2 | 1 | 3 | 1 | 9 |
| Silicon content (ppm) | 0.1 | 0.1 | 40 | 45 | 35 | 0.1 | 40 | 60 |
| Ash content (ppm) | 70 | 75 | 60 | 65 | 75 | 75 | 60 | 110 |
| Degree of orientation | 0.45 | 0.42 | 0.45 | 0.42 | 0.42 | 0.35 | 0.37 | 0.32 |
| Thread diameter (μm) | 17 | 20 | 23 | 26 | 13 | 33 | 35 | 38 |
| 1) Creep resistance | ◎ | ◎ | ◎ | ◎ | ◎ | X | X | X |
| 2) Strength | ◎ | ◎ | ◎ | ◎ | ◎ | X | X | X |

TABLE 1-continued

|  | Example | | | | | Comparative Example | | |
|---|---|---|---|---|---|---|---|---|
|  | 1 | 2 | 3 | 4 | 5 | 1 | 2 | 3 |
| 3) Rate of shape retention | ◎ | ◎ | ◎ | ◎ | ◎ | X | X | X |
| 4) High-speed winding | ◎ | ◎ | ◎ | ◎ | ◎ | X | X | X |

The present application is based on Japanese Patent Application No. 2017-220420 filed on Nov. 15, 2017, the contents of which are incorporated herein by reference.

INDUSTRIAL APPLICABILITY

The polyethylene fiber of the present invention can achieve every performance of excellent strength, creep resistance, and shape retention and the capability of winding a thread at a high speed. As a result, the polyethylene fiber of the present invention has industrial applicability to uses including: high-performance textiles such as various types of sports clothing and various safety products (e.g., bullet-proof clothing, protective clothing and protective gloves); various rope products such as tag ropes, mooring ropes, sailboat ropes, and construction ropes; various braid products such as fishing lines and blind cables; and net products such as fishing nets and safety nets.

The invention claimed is:

1. An ultra-high molecular weight polyethylene fiber having a viscosity-average molecular weight of $10 \times 10^4$ to $1000 \times 10^4$, wherein
the ultra-high molecular weight polyethylene fiber has at least three melting peaks in a heating differential scanning calorimetry curve, and
in the melting peaks, the difference between (I) a peak temperature of a melting peak appearing between 140° C. or higher and lower than 150° C. and (II) a peak temperature of a melting peak appearing between 150° C. or higher and lower than 158° C. is 10° C. or less,
a ratio of an area ($\Delta H_2$) at or below (I) a peak temperature of a melting peak appearing between 140° C. or higher and lower than 150° C. to an area ($\Delta H_1$) of a whole melting peak is 15% or more and 35% or less, and
a ratio of an area ($\Delta H_3$) at or above (III) a peak temperature of a melting peak appearing between 158° C. or higher and 170° C. or lower to the area ($\Delta H_1$) of the whole melting peak is 5% or more and 10% or less.

2. The ultra-high molecular weight polyethylene fiber according to claim 1, wherein the ultra-high molecular weight polyethylene fiber has a degree of orientation of 0.40 or more.

3. The ultra-high molecular weight polyethylene fiber according to claim 1, comprising a copolymer of ethylene and a comonomer, wherein a content of a comonomer unit in the copolymer is 0.01% by mol or more and 5% by mol or less.

4. The ultra-high molecular weight polyethylene fiber according to claim 1, wherein the ultra-high molecular weight polyethylene fiber has a titanium content of 5 ppm or lower.

5. The ultra-high molecular weight polyethylene fiber according to claim 1, wherein the ultra-high molecular weight polyethylene fiber has a silicon content of 0.1 ppm or higher and 50 ppm or lower.

6. The ultra-high molecular weight polyethylene fiber according to claim 1, wherein the ultra-high molecular weight polyethylene fiber has Mw/Mn of 3.0 or more and 13 or less.

7. The ultra-high molecular weight polyethylene fiber according to claim 1, wherein the ultra-high molecular weight polyethylene fiber has an ash content of 100 ppm or lower.

8. The ultra-high molecular weight polyethylene fiber according to claim 1, wherein the ultra-high molecular weight polyethylene fiber has a creep life of at least 72 hours at a temperature of 70° C. under 30% load of breaking stress.

* * * * *